(12) United States Patent
Dimou et al.

(10) Patent No.: US 12,719,618 B2
(45) Date of Patent: Aug. 25, 2026

(54) PERFORMING UPLINK TRANSMISSIONS ACCORDING TO CODEBOOK TIMESPANS

(71) Applicant: QUALCOMM Incorporated, San Diego, CA (US)

(72) Inventors: Konstantinos Dimou, New York, NY (US); Wei Yang, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 18/548,306

(22) PCT Filed: May 17, 2022

(86) PCT No.: PCT/US2022/072370

§ 371 (c)(1),
(2) Date: Aug. 29, 2023

(87) PCT Pub. No.: WO2022/246401

PCT Pub. Date: Nov. 24, 2022

(65) Prior Publication Data

US 2024/0137163 A1 Apr. 25, 2024
US 2024/0235747 A9 Jul. 11, 2024

(30) Foreign Application Priority Data

May 21, 2021 (GR) .............................. 20210100336

(51) Int. Cl.
*H04L 1/1829* (2023.01)

(52) U.S. Cl.
CPC .......... *H04L 1/1854* (2013.01); *H04L 1/1864* (2013.01)

(58) Field of Classification Search
CPC ............................ H04L 1/1854; H04L 1/1864
USPC .......................................................... 370/329
See application file for complete search history.

(56) References Cited

U.S. PATENT DOCUMENTS

2020/0213981 A1* 7/2020 Park ...................... H04W 72/23
2023/0066773 A1* 3/2023 Lei ........................ H04L 1/1854
2024/0072975 A1* 2/2024 Rastegardoost ...... H04W 72/20

OTHER PUBLICATIONS

CATT, “Discussion on PUSCH resource collision and DL SPS enhancement”, R1-1912174, Nov. 18-22, 2019 (From Applicant’s IDS) (Year: 2019).*

China Telecom, “Discussion on UE feedback enhancements for HARQ-ACK”, R1-2102867, Apr. 12-20, 2021. (From Applicant’s IDS) (Year: 2021).*

(Continued)

*Primary Examiner* — Mang Hang Yeung
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a physical downlink shared channel (PDSCH) transmission in a first slot, wherein the PDSCH transmission is associated with a codebook timespan. The UE may perform, to the network entity, a physical uplink control channel (PUCCH) transmission in a subsequent slot based at least in part on an adjustment to the codebook timespan, wherein the PUCCH transmission indicates a hybrid automatic repeat request (HARQ) associated with the PDSCH transmission. Numerous other aspects are described.

26 Claims, 20 Drawing Sheets

1400

(56) References Cited

OTHER PUBLICATIONS

CATT: "Discussion on PUSCH Resource Collision and DL SPS Enhancement", 3GPP TSG RAN WG1 Meeting #99, R1-1912174, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823252, 7 Pages, Figure 5, Section 3.1.

China Telecom: "Discussion on UE Feedback Enhancements for HARQ-ACK", 3GPP TSG RAN WG1 #104b, R1-2102867, 3GPP, Mobile Competence Centre, 650, Route Des Lucioles, F-06921 Sophia-Antipolis Cedex, France, vol. RAN WG1, No. e-Meeting, Apr. 12, 2021-Apr. 20, 2021, 10 Pages, Apr. 6, 2021, XP052058898, the whole document.

International Search Report and Written Opinion—PCT/US2022/072370—ISA/EPO—Sep. 15, 2022.

* cited by examiner

1700

PERFORMING UPLINK TRANSMISSIONS ACCORDING TO CODEBOOK TIMESPANS

CROSS-REFERENCE TO RELATED APPLICATIONS

This Patent Application is a 371 national stage of PCT Application No. PCT/US2022/072370 filed on May 17, 2022, entitled "PERFORMING UPLINK TRANSMISSIONS ACCORDING TO CODEBOOK TIMESPANS," which claims priority to Greece Patent Application Serial No. 20210100336, filed on May 21, 2021, entitled "PERFORMING UPLINK TRANSMISSIONS ACCORDING TO CODEBOOK TIMESPANS," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for performing uplink transmissions according to codebook timespans.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a network entity, a physical downlink shared channel (PDSCH) transmission in a first slot, wherein the PDSCH transmission is associated with a codebook timespan; and perform, to the network entity, a physical uplink control channel (PUCCH) transmission in a subsequent slot based at least in part on an adjustment to the codebook timespan, wherein the PUCCH transmission indicates a hybrid automatic repeat request (HARQ) associated with the PDSCH transmission.

In some aspects, a network entity for wireless communication includes a memory and one or more processors, coupled to the memory, configured to: transmit, to a UE, a PDSCH transmission in a first slot, wherein the PDSCH transmission is associated with a codebook timespan; and receive, from the UE, a PUCCH transmission in a subsequent slot based at least in part on an adjustment to the codebook timespan, wherein the PUCCH transmission indicates a HARQ associated with the PDSCH transmission.

In some aspects, a UE for wireless communication includes a memory and one or more processors, coupled to the memory, configured to: receive, from a network entity, a configuration associated with a codebook, wherein the codebook is a type 1 codebook; and perform, to the network entity, a PUCCH transmission based at least in part on the configuration, wherein the PUCCH transmission indicates a HARQ associated with a PDSCH transmission.

In some aspects, a network entity for wireless communication includes a memory and one or more processors, coupled to the memory, configured to: transmit, to a UE, a configuration associated with a codebook, wherein the codebook is a type 1 codebook; and receive, from the UE, a PUCCH transmission based at least in part on the configuration, wherein the PUCCH transmission indicates a HARQ associated with a PDSCH transmission.

In some aspects, a method of wireless communication performed by a UE includes receiving, from a network entity, a PDSCH transmission in a first slot, wherein the PDSCH transmission is associated with a codebook timespan; and performing, to the network entity, a PUCCH transmission in a subsequent slot based at least in part on an adjustment to the codebook timespan, wherein the PUCCH transmission indicates a HARQ associated with the PDSCH transmission.

In some aspects, a method of wireless communication performed by a network entity includes transmitting, to a UE, a PDSCH transmission in a first slot, wherein the PDSCH transmission is associated with a codebook timespan; and receiving, from the UE, a PUCCH transmission in a subsequent slot based at least in part on an adjustment to the codebook timespan, wherein the PUCCH transmission indicates a HARQ associated with the PDSCH transmission.

In some aspects, a method of wireless communication performed by a UE includes receiving, from a network entity, a configuration associated with a codebook, wherein the codebook is a type 1 codebook; and performing, to the network entity, a PUCCH transmission based at least in part on the configuration, wherein the PUCCH transmission indicates a HARQ associated with a PDSCH transmission.

In some aspects, a method of wireless communication performed by a network entity includes transmitting, to a UE, a configuration associated with a codebook, wherein the codebook is a type 1 codebook; and receiving, from the UE, a PUCCH transmission based at least in part on the configuration, wherein the PUCCH transmission indicates a HARQ associated with a PDSCH transmission.

In some aspects, a non-transitory computer-readable medium storing a set of instructions for wireless communication includes one or more instructions that, when executed by one or more processors of a UE, cause the UE to: receive, from a network entity, a PDSCH transmission in a first slot, wherein the PDSCH transmission is associated with a codebook timespan; and perform, to the network entity, a PUCCH transmission in a subsequent slot based at least in part on an adjustment to the codebook timespan, wherein the PUCCH transmission indicates a HARQ associated with the PDSCH transmission.

In some aspects, a non-transitory computer-readable medium storing a set of instructions for wireless communication includes one or more instructions that, when executed by one or more processors of a network entity, cause the network entity to: transmit, to a UE, a PDSCH transmission in a first slot, wherein the PDSCH transmission is associated with a codebook timespan; and receive, from the UE, a PUCCH transmission in a subsequent slot based at least in part on an adjustment to the codebook timespan, wherein the PUCCH transmission indicates a HARQ associated with the PDSCH transmission.

In some aspects, a non-transitory computer-readable medium storing a set of instructions for wireless communication includes one or more instructions that, when executed by one or more processors of a UE, cause the UE to: receive, from a network entity, a configuration associated with a codebook, wherein the codebook is a type 1 codebook; and perform, to the network entity, a PUCCH transmission based at least in part on the configuration, wherein the PUCCH transmission indicates a HARQ associated with a PDSCH transmission.

In some aspects, a non-transitory computer-readable medium storing a set of instructions for wireless communication includes one or more instructions that, when executed by one or more processors of a network entity, cause the network entity to: transmit, to a UE, a configuration associated with a codebook, wherein the codebook is a type 1 codebook; and receive, from the UE, a PUCCH transmission based at least in part on the configuration, wherein the PUCCH transmission indicates a HARQ associated with a PDSCH transmission.

In some aspects, an apparatus for wireless communication includes means for receiving, from a network entity, a PDSCH transmission in a first slot, wherein the PDSCH transmission is associated with a codebook timespan; and means for performing, to the network entity, a PUCCH transmission in a subsequent slot based at least in part on an adjustment to the codebook timespan, wherein the PUCCH transmission indicates a HARQ associated with the PDSCH transmission.

In some aspects, an apparatus for wireless communication includes means for transmitting, to a UE, a PDSCH transmission in a first slot, wherein the PDSCH transmission is associated with a codebook timespan; and means for receiving, from the UE, a PUCCH transmission in a subsequent slot based at least in part on an adjustment to the codebook timespan, wherein the PUCCH transmission indicates a HARQ associated with the PDSCH transmission.

In some aspects, an apparatus for wireless communication includes means for receiving, from a network entity, a configuration associated with a codebook, wherein the codebook is a type 1 codebook; and means for performing, to the network entity, a PUCCH transmission based at least in part on the configuration, wherein the PUCCH transmission indicates a HARQ associated with a PDSCH transmission.

In some aspects, an apparatus for wireless communication includes means for transmitting, to a UE, a configuration associated with a codebook, wherein the codebook is a type 1 codebook; and means for receiving, from the UE, a PUCCH transmission based at least in part on the configuration, wherein the PUCCH transmission indicates a HARQ associated with a PDSCH transmission.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
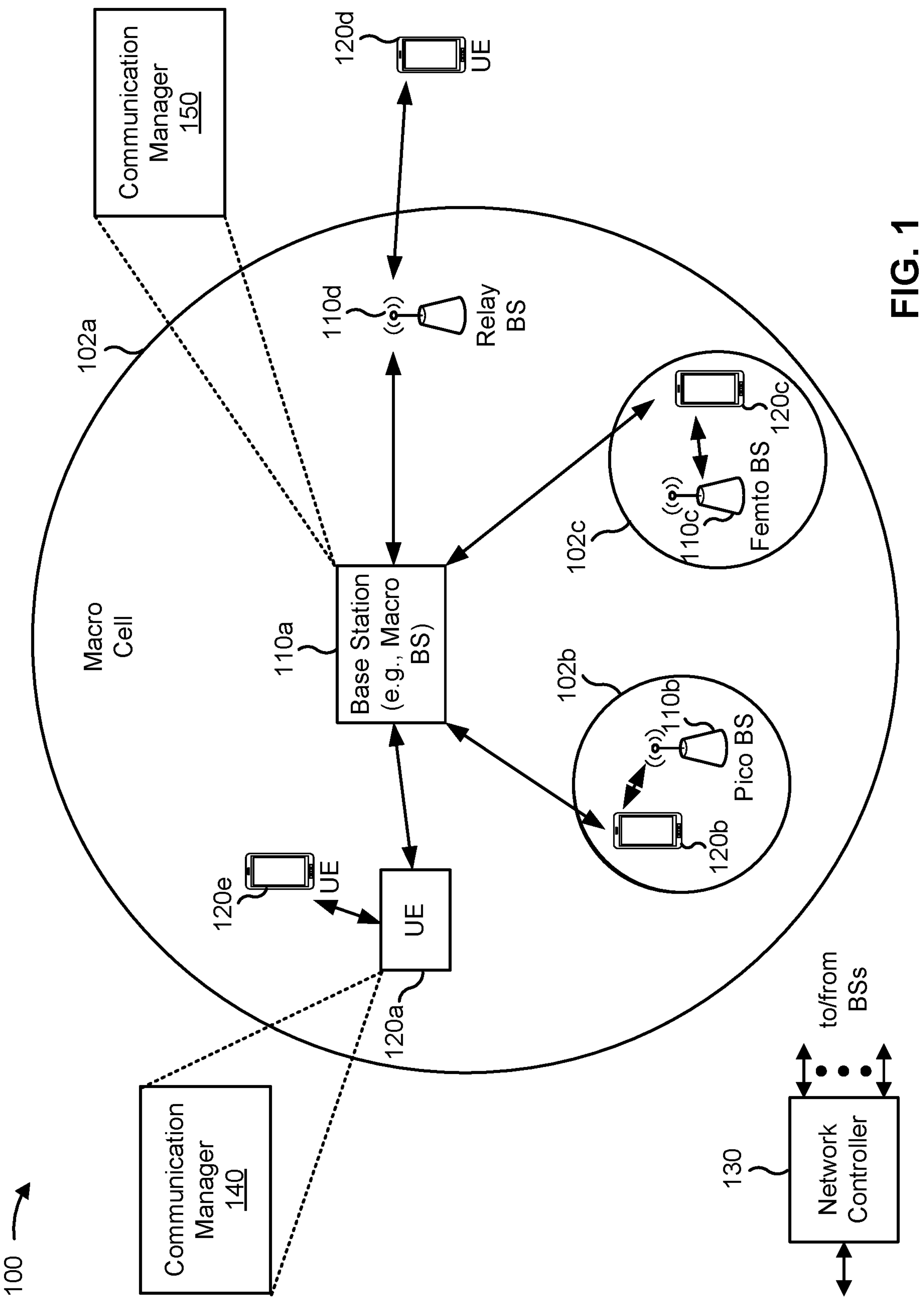
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity, a physical downlink shared channel (PDSCH) transmission in a first slot, wherein the PDSCH transmission is associated with a codebook timespan; and perform, to the network entity, a physical uplink control channel (PUCCH) transmission in a subsequent slot based at least in part on an adjustment to the codebook timespan, wherein the PUCCH transmission indicates a hybrid automatic repeat request (HARQ) associated with the PDSCH transmission. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, a PDSCH transmission in a first slot, wherein the PDSCH transmission is associated with a codebook timespan; and receive, from the UE, a PUCCH transmission in a subsequent slot based at least in part on an adjustment to the codebook timespan, wherein the PUCCH transmission indicates a HARQ associated with the PDSCH transmission. Additionally, or alternatively, the communication manager 150 may perform one or more other operations described herein.

In some aspects, a UE (e.g., UE 120) may include a communication manager 140. As described in more detail elsewhere herein, the communication manager 140 may receive, from a network entity, a configuration associated with a codebook, wherein the codebook is a type 1 codebook; and perform, to the network entity, a PUCCH transmission based at least in part on the configuration, wherein the PUCCH transmission indicates a HARQ associated with a PDSCH transmission. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a UE, a configuration associated with a codebook, wherein the codebook is a type 1 codebook; and receive, from the UE, a PUCCH transmission based at least in part on the configuration, wherein the PUCCH transmission indicates a HARQ associated with a physical downlink shared channel (PDSCH) transmission. Additionally, or alternatively, the communication manager 150 may perform one or more other operations described herein.

As indicated above, FIG. 1 is provided as an example. Other examples may differ from what is described with regard to FIG. 1.

Figure 2:
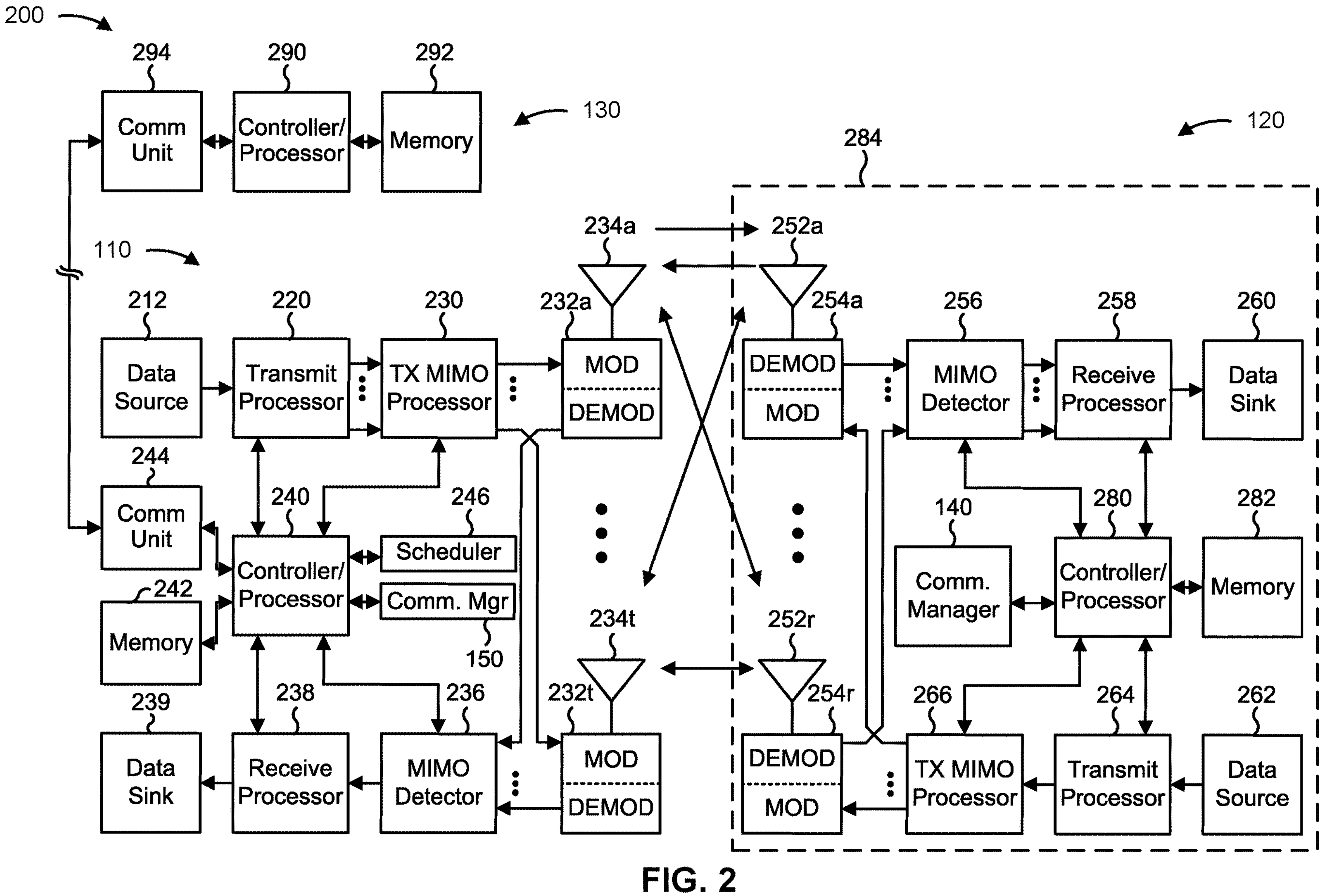
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-17).

The controller/processor 240 of the base station 110, the controller/processor 280 of the UE 120, and/or any other component(s) of FIG. 2 may perform one or more techniques associated with performing uplink transmissions according to codebook timespans, as described in more detail elsewhere herein. For example, the controller/processor 240 of the base station 110, the controller/processor 280 of the UE 120, and/or any other component(s) of FIG. 2 may perform or direct operations of, for example, process 1400 of FIG. 14, process 1500 of FIG. 15, process 1600 of FIG. 16, process 1700 of FIG. 17, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, process 1600 of FIG. 16, process 1700 of FIG. 17, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, a PDSCH transmission in a first slot, wherein the PDSCH transmission is associated with a codebook timespan; and/or means for performing, to the network entity, a PUCCH transmission in a subsequent slot based at least in part on an adjustment to the codebook timespan, wherein the PUCCH transmission indicates a HARQ associated with the PDSCH transmission. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network entity (e.g., base station 110) includes means for transmitting, to a UE, a PDSCH transmission in a first slot, wherein the PDSCH transmission is associated with a codebook timespan; and/or means for receiving, from the UE, a PUCCH transmission in a subsequent slot based at least in part on an adjustment to the codebook timespan, wherein the PUCCH transmission indicates a HARQ associated with the PDSCH transmission. The means for the network entity to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, a UE (e.g., UE 120) includes means for receiving, from a network entity, a configuration associated with a codebook, wherein the codebook is a type 1 codebook; and/or means for performing, to the network entity, a PUCCH transmission based at least in part on the configuration, wherein the PUCCH transmission indicates a HARQ associated with a physical downlink shared channel (PDSCH) transmission. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network entity (e.g., base station 110) includes means for transmitting, to a UE, a configuration associated with a codebook, wherein the codebook is a type 1 codebook; and/or means for receiving, from the UE, a PUCCH transmission based at least in part on the configuration, wherein the PUCCH transmission indicates a HARQ associated with a PDSCH transmission. The means for the network entity to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
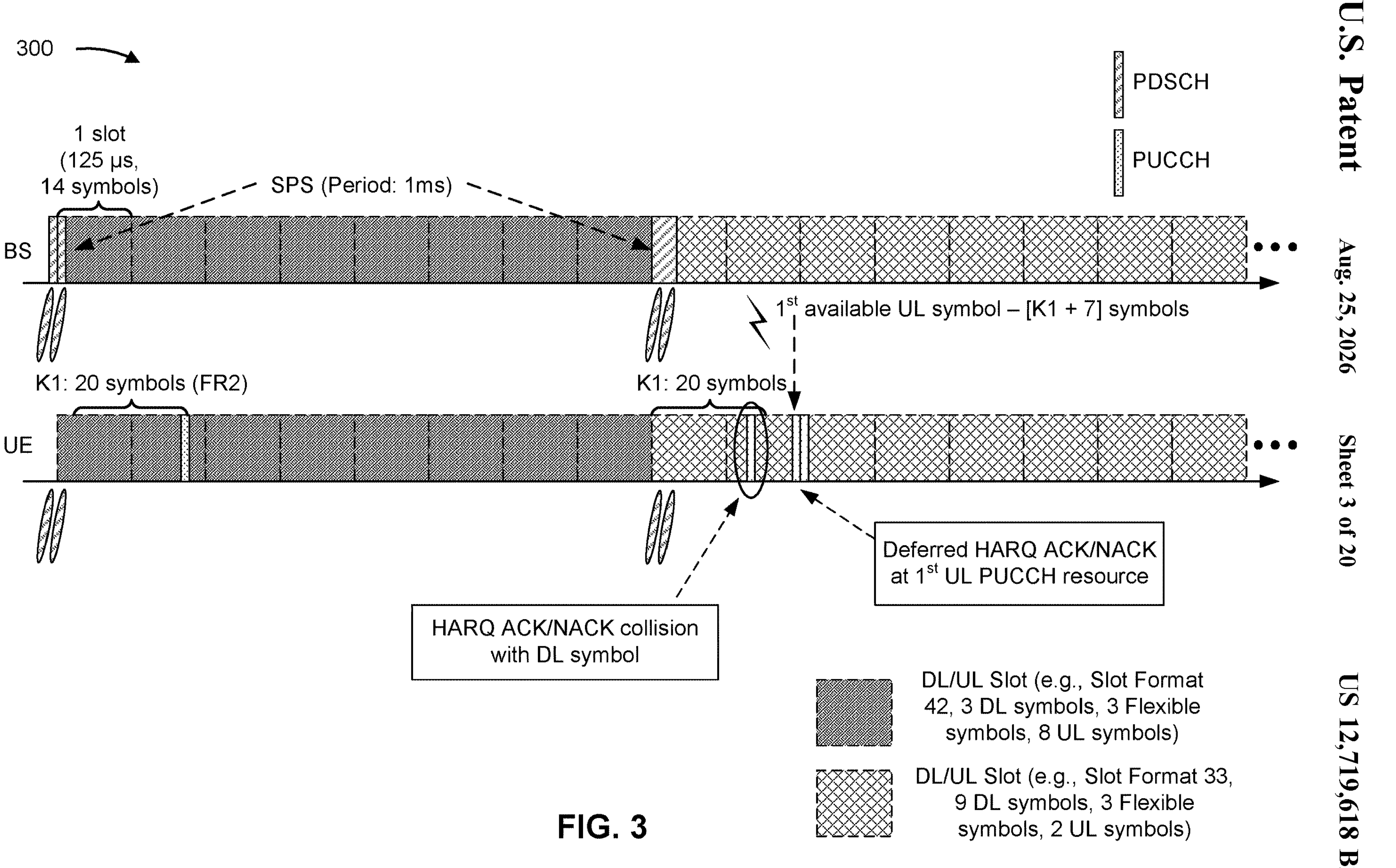
FIG. 3 is a diagram illustrating an example of a deferred HARQ acknowledgement/negative acknowledgement (ACK/NACK), in accordance with the present disclosure.

FIG. 3 is a diagram illustrating an example 300 of a deferred HARQ acknowledgement/negative acknowledgement (ACK/NACK), in accordance with the present disclosure.

A network entity (e.g., base station 110) may transmit, to a UE (e.g., UE 120), a semi-persistent scheduling (SPS) via a PDSCH in a slot. The slot may be associated with a first type. The UE may transmit, to the network entity, a HARQ ACK/NACK based at least in part on a K1 value, which may indicate a quantity of symbols (e.g., 20 symbols). For example, the UE may transmit the HARQ ACK/NACK in a next slot based at least in part on the K1 value. The UE may transmit the HARQ ACK/NACK via a PUCCH.

In some cases, a slot format may change from the first type to a second type, and a network entity may transmit, to a UE, an SPS via a PDSCH in a slot associated with the second type. A HARQ ACK/NACK (which may include one or more bits) associated with the SPS may collide with a downlink symbol based at least in part on a K1 value. In this case, the HARQ ACK/NACK may be deferred to a first available uplink symbol (e.g., a first available PUCCH resource). For example, the deferred HARQ ACK/NACK may be transmitted at K1+7 symbols (e.g., 27 symbols after the SPS is transmitted via the PDSCH in the slot. A slot format change may be according to a pattern defined in a slot format combinations per cell (SlotFormatCombinationsPerCell) information element (IE). Further, an SPS PUCCH ACK/NACK may be associated with a PUCCH format 0 (1 bit), and the first uplink PUCCH resource may correspond to the first available uplink symbol.

As indicated above, FIG. 3 is provided as an example. Other examples may differ from what is described with regard to FIG. 3.

Figure 4:
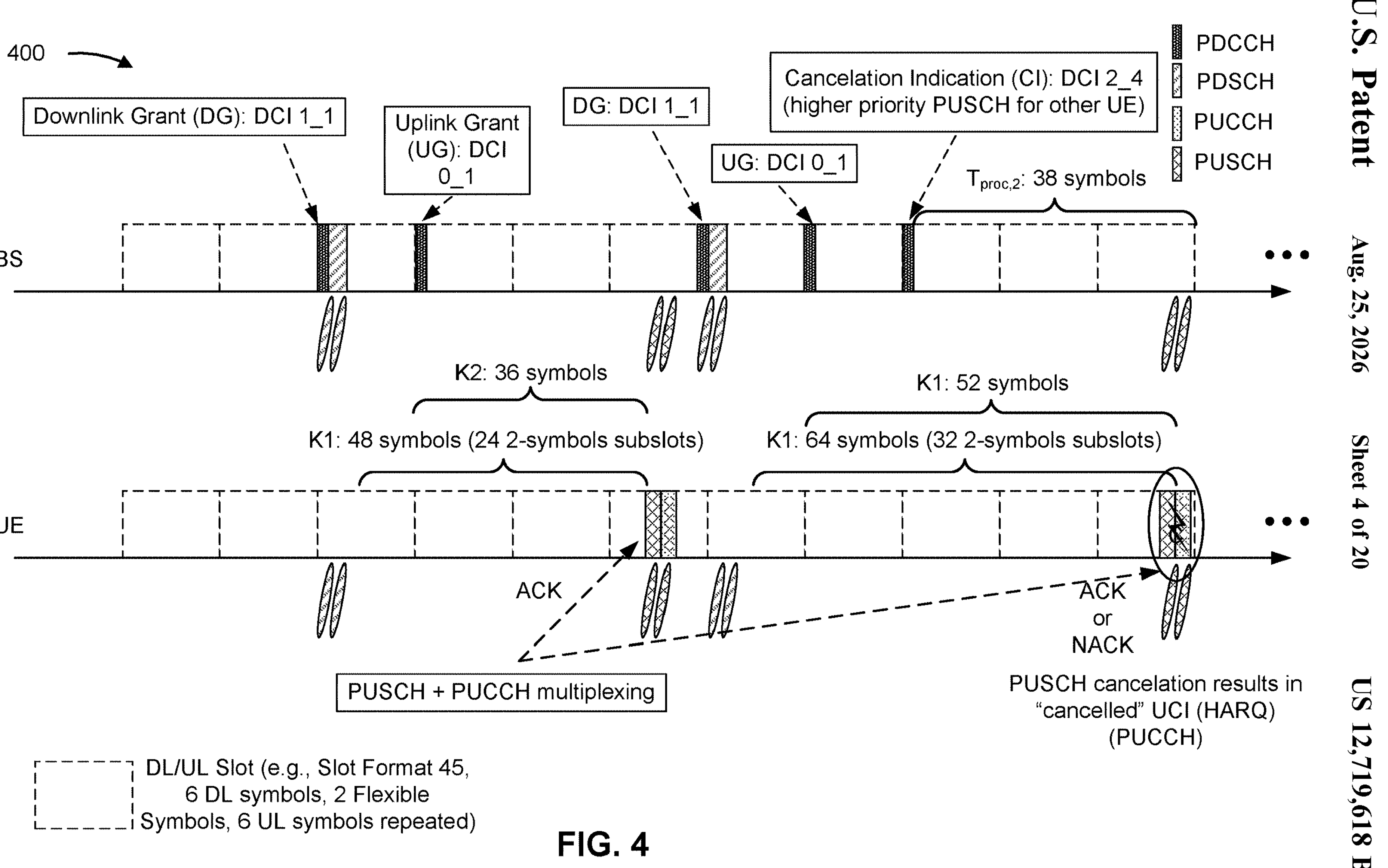
FIG. 4 is a diagram illustrating an example of a dropped PUCCH based at least in part on a cancelation indication, in accordance with the present disclosure.

FIG. 4 is a diagram illustrating an example 400 of a dropped PUCCH based at least in part on a cancelation indication, in accordance with the present disclosure.

A network entity (e.g., base station 110) may transmit, to a UE (e.g., UE 120), a downlink grant in downlink control information (DCI) (e.g., DCI format 1_1) via a physical downlink control channel (PDCCH). The downlink grant may indicate resources for a PDSCH transmission. The network entity may transmit, to the UE, an uplink grant in DCI (e.g., DCI format 0_1) via a PDCCH. The UE may perform a PUSCH transmission based at least in part on the uplink grant, where the PUSCH transmission may be K2 symbols (e.g., 36 symbols) after the uplink grant. The UE may perform a PUCCH transmission containing a HARQ ACK/NACK based at least in part on the PDSCH transmission, where the PUCCH transmission may be K1 symbols (e.g., 48 symbols) after the PDSCH transmission. The UE may multiplex the PUSCH transmission and the PUCCH transmission. In other words, the UE may perform a PUSCH and PUCCH multiplexing using uplink symbol(s).

At a later time, the network entity may transmit, to the UE, a second downlink grant in DCI via a second PDCCH. The second downlink grant may indicate resources for a second PDSCH transmission. The network entity may transmit, to the UE, a second uplink grant in DCI via a second PDCCH. The network entity may transmit, to the UE, a cancelation indication in DCI (e.g., DCI format 2_4) based at least in part on a higher priority PUSCH for another UE. The UE may cancel, based at least in part on the cancelation indication, a second PUSCH transmission based at least in part on the second uplink grant. As a result, a second PUCCH transmission containing a HARQ ACK/NACK based at least in part on the second PDSCH transmission may be canceled. The second PUCCH transmission containing the HARQ ACK/NACK for the second PDSCH transmission may be dropped and not transmitted to the network entity, based at least in part on the cancellation indication that cancels the second PUSCH transmission.

As indicated above, FIG. 4 is provided as an example. Other examples may differ from what is described with regard to FIG. 4.

Figure 5:
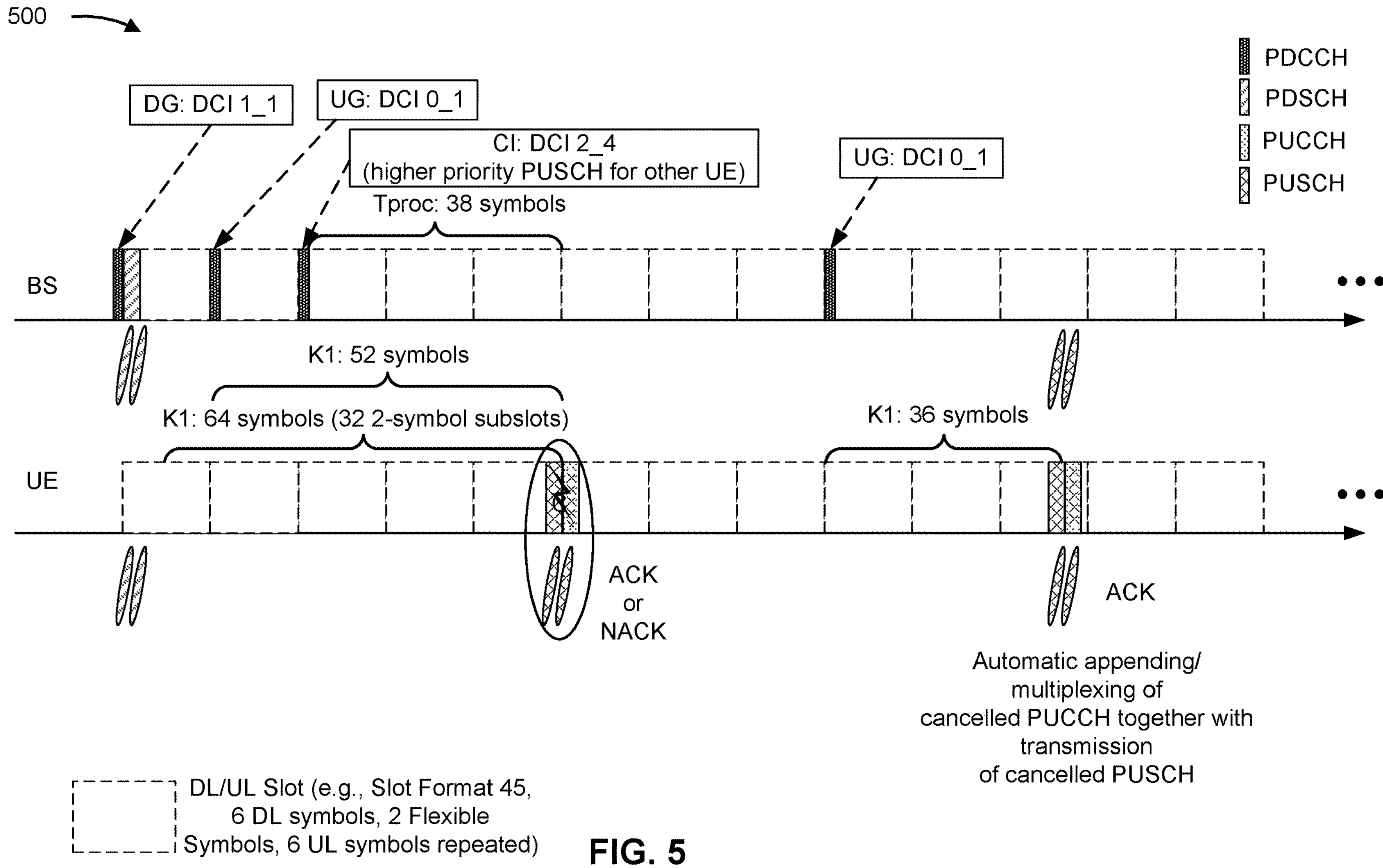
FIG. 5 is a diagram illustrating an example of a canceled PUCCH transmission with a canceled physical uplink shared channel (PUSCH) transmission, in accordance with the present disclosure.

FIG. 5 is a diagram illustrating an example 500 of a canceled PUCCH transmission with a canceled PUSCH transmission, in accordance with the present disclosure.

A network entity (e.g., base station 110) may transmit, to a UE (e.g., UE 120), a downlink grant in DCI (e.g., DCI format 1_1) via a PDCCH. The downlink grant may indicate resources for a PDSCH transmission. The network entity may transmit, to the UE, an uplink grant in DCI (e.g., DCI format 0_1) via a PDCCH. The network entity may transmit, to the UE, a cancelation indication in DCI (e.g., DCI format 2_4) based at least in part on a higher priority PUSCH for another UE. The UE may cancel, based at least in part on the cancelation indication, a PUSCH transmission based at least in part on the uplink grant. As a result, a PUCCH transmission containing a HARQ ACK/NACK based at least in part on the PDSCH transmission may be canceled.

The UE may receive a second uplink grant, after the cancelation indication, in place of the first uplink grant. The UE may perform the PUSCH transmission and the PUCCH transmission (e.g., via a PUSCH and PUCCH multiplexing) after the cancelation indication. In other words, the UE may transmit a canceled HARQ ACK/NACK via the PUCCH transmission with a co-canceled PUSCH (re)-transmission after the cancelation indication. The UE may append or multiplex a canceled PUCCH together with a transmission of a canceled PUSCH, based at least in part on a rule configured during a radio resource control (RRC) connection establishment. Further, a downlink packet for which the HARQ ACK/NACK is transmitted may not yet be expired. The network entity may determine that canceled HARQ ACK/NACK is to be transmitted, so the network entity may perform an appropriate uplink allocation that allows the UE to perform the PUSCH transmission with the PUCCH transmission after the cancelation indication.

As indicated above, FIG. 5 is provided as an example. Other examples may differ from what is described with regard to FIG. 5.

Figure 6:
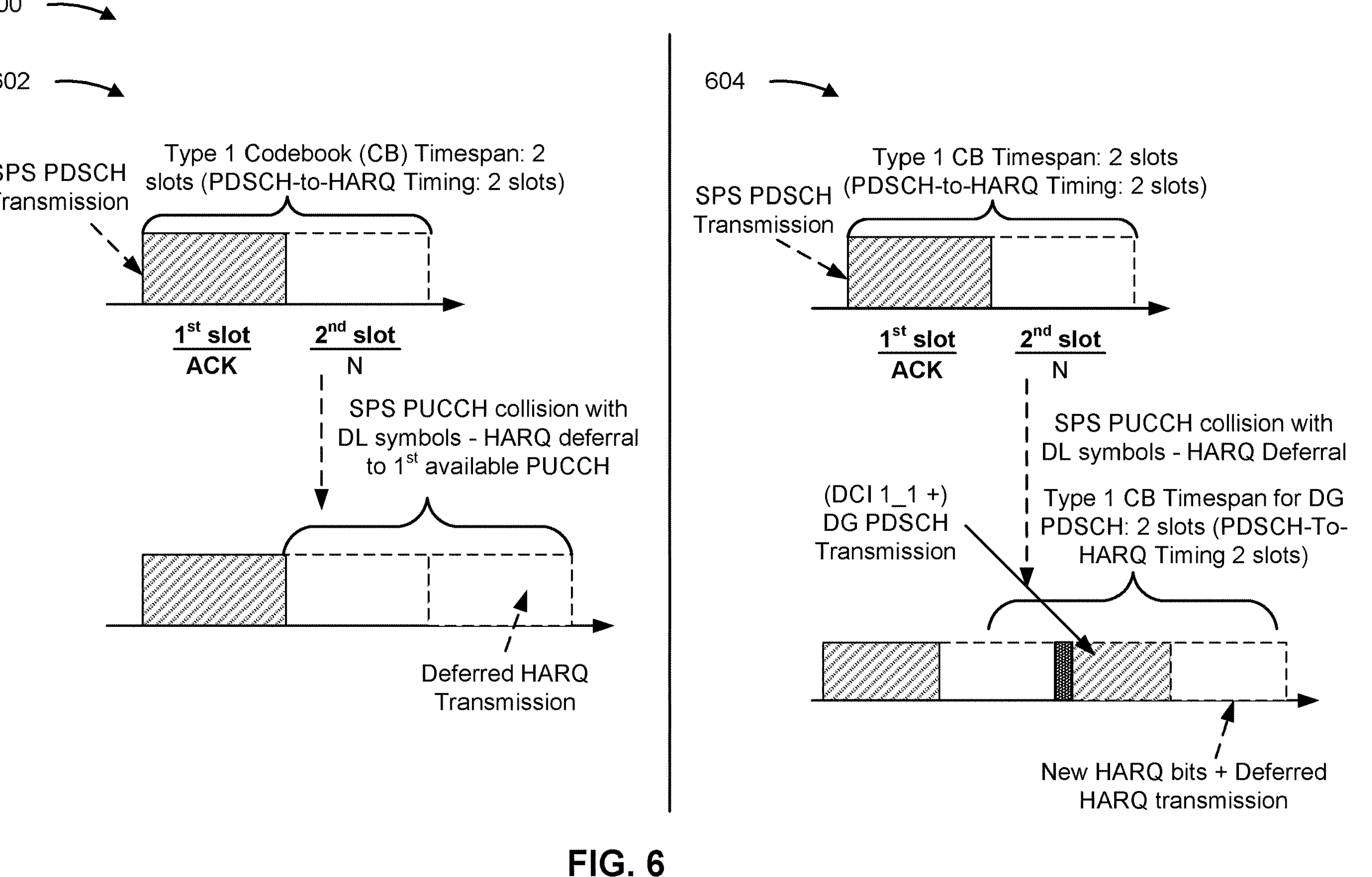
FIG. 6 is a diagram illustrating examples of type 1 codebook timespans, in accordance with the present disclosure.

FIG. 6 is a diagram illustrating examples 600 of type 1 codebook timespans, in accordance with the present disclosure.

As shown by reference number 602, a type 1 codebook timespan may be two slots, based at least in part on a PDSCH-to-HARQ timing of two slots. A same slot size may be defined for both a downlink and an uplink. A first slot may be associated with an SPS PDSCH transmission (e.g., a single SPS PDSCH transmission). The SPS PDSCH transmission may be successful, so the SPS PDSCH transmission may be associated with an ACK. In a second slot, an SPS PUCCH, which may contain a HARQ ACK/NACK based at least in part on the SPS PDSCH transmission, may collide with downlink symbols. As a result, the HARQ ACK/NACK may be deferred to a first available PUCCH, which may occur in a third slot. However, since the type 1 codebook timespan is defined as two slots, the type 1 codebook timespan may not cover the SPS PDSCH transmission. Further, the third slot, which may correspond to an uplink slot in which the deferred HARQ ACK/NACK is transmitted, may not be covered by a K1 value based at least in part on the type 1 codebook timespan.

As shown by reference number 604, a type 1 codebook timespan may be two slots, based at least in part on a PDSCH-to-HARQ timing of two slots. A first slot may be associated with an SPS PDSCH transmission. The SPS PDSCH transmission may be successful, so the SPS PDSCH transmission may be associated with an ACK. In a second slot, an SPS PUCCH, which may contain a HARQ ACK/NACK based at least in part on the SPS PDSCH transmission, may collide with downlink symbols, so the HARQ ACK/NACK may need to be deferred. In a third slot, a downlink grant PDSCH transmission may occur (e.g., based at least in part on DCI format 1_1). The downlink grant PDSCH transmission may also be associated with a type 1 codebook timespan of two slots based at least in part on a PDSCH-to-HARQ timing of two slots. In a fourth slot, a UE (e.g., UE 120) may need to transmit both a deferred HARQ ACK/NACK based at least in part on the SPS PDSCH transmission in the first slot and new HARQ ACK/NACK bits based at least in part on the downlink grant PDSCH transmission in the third slot. However, the type 1 codebook timespan for the downlink grant PDSCH transmission may not cover the SPS PDSCH transmission.

As indicated above, FIG. 6 is provided as an example. Other examples may differ from what is described with regard to FIG. 6.

Figure 7:
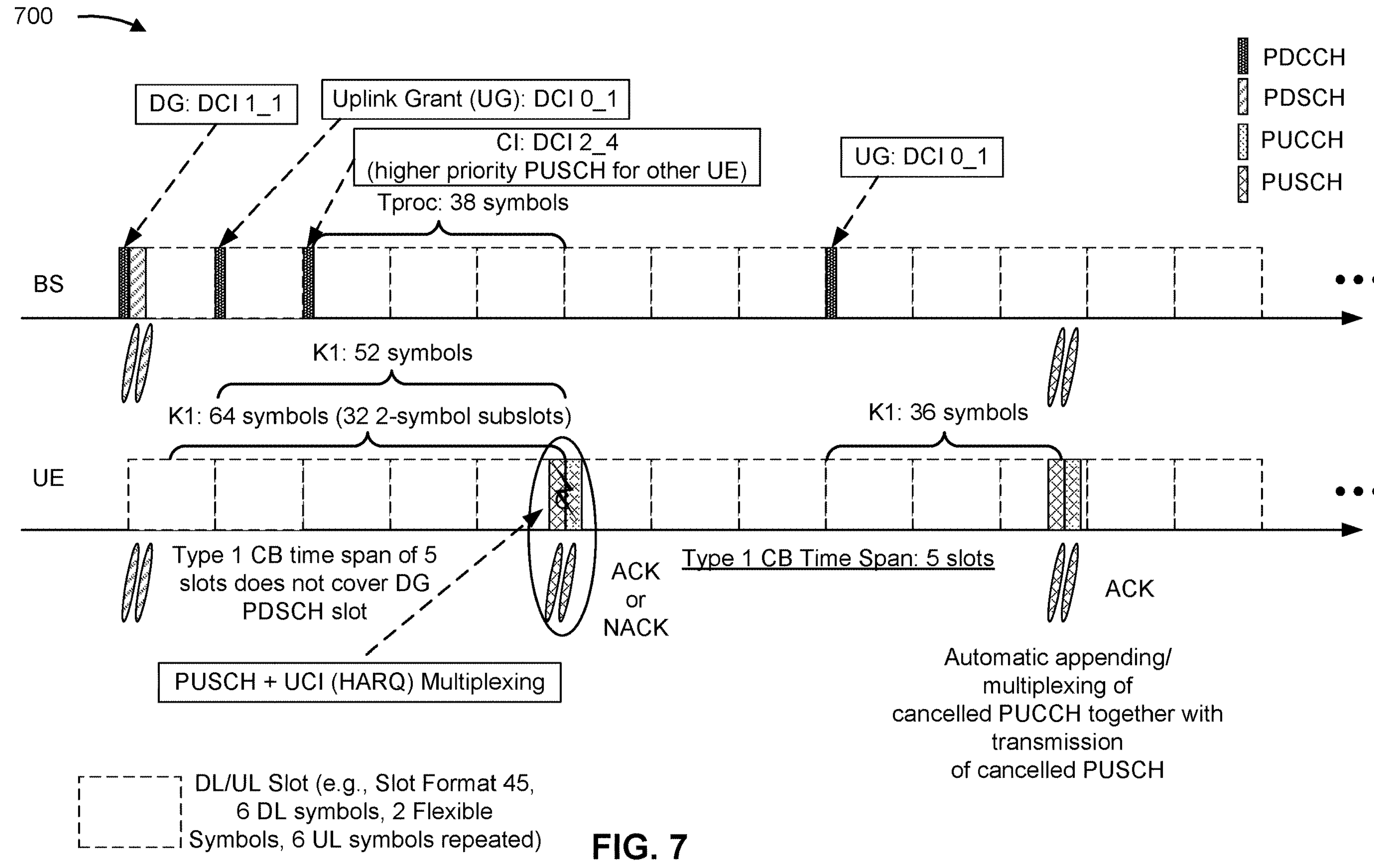
FIG. 7 is a diagram illustrating an example of a type 1 codebook timespan, in accordance with the present disclosure.

FIG. 7 is a diagram illustrating an example 700 of a type 1 codebook timespan, in accordance with the present disclosure.

A network entity (e.g., base station 110) may transmit, to a UE (e.g., UE 120), a downlink grant in DCI (e.g., DCI format 1_1) via a PDCCH. The downlink grant may indicate resources for a PDSCH transmission. The network entity may transmit, to the UE, an uplink grant in DCI (e.g., DCI format 0_1) via a PDCCH. The network entity may transmit, to the UE, a cancelation indication in DCI (e.g., DCI format 2_4) based at least in part on a higher priority PUSCH for another UE. The UE may cancel, based at least in part on the cancelation indication, a PUSCH transmission based at least in part on the uplink grant. As a result, a PUCCH transmission containing a HARQ ACK/NACK based at least in part on the PDSCH transmission may be canceled.

A type 1 codebook timespan associated with a downlink grant PDSCH slot (e.g., a slot associated with the PDSCH transmission) may be five slots. The UE may attempt to multiplex the PUSCH transmission with the PUCCH transmission. However, the UE may be unable to multiplex the PDSCH transmission and the PUCCH transmission, irrespective of the cancelation indication, within the five slots associated with the type 1 codebook timespan. As a result, the type 1 codebook timespan of five slots may not cover the downlink grant PDSCH slot.

As indicated above, FIG. 7 is provided as an example. Other examples may differ from what is described with regard to FIG. 7.

An SPS PDSCH transmission may be performed in a first slot. The SPS PDSCH transmission may be associated with a codebook timespan, such as a type 1 codebook timespan. A second slot may be associated with an SPS PUCCH collision with downlink symbols, so a PUCCH transmission containing HARQ ACK/NACK may be deferred to a first available PUCCH. The PUCCH transmission may be performed in a later slot with the first available PUCCH. A type 1 codebook timespan may not be sufficient to cover an SPS PDSCH. Alternatively, the PUCCH transmission may be multiplexed with a new PUCCH transmission in the later slot based at least in part on a downlink grant PDSCH transmission associated with the new PUCCH transmission. A type 1 codebook timespan for a downlink grant PDSCH may not cover an SPS PDSCH.

In various aspects of techniques and apparatuses described herein, a UE may receive, from a network entity, a PDSCH transmission in a first slot. The PDSCH transmission may be associated with a codebook timespan. The UE may perform, to the network entity, a PUCCH transmission in a subsequent slot based at least in part on an adjustment to the codebook timespan. The PUCCH transmission may indicate a HARQ ACK/NACK associated with the PDSCH transmission. In some aspects, the codebook timespan may be a type 1 codebook timespan, and the codebook timespan prior to the adjustment may be based at least in part on a PDSCH-to-HARQ timing. In some aspects, the UE may receive, from the network entity, an RRC configuration that configures the codebook timespan to be extended, and the UE may extend the codebook timespan based at least in part on the RRC configuration. As a result, the codebook timespan may be sufficient to cover the PDSCH transmission.

Figure 8:
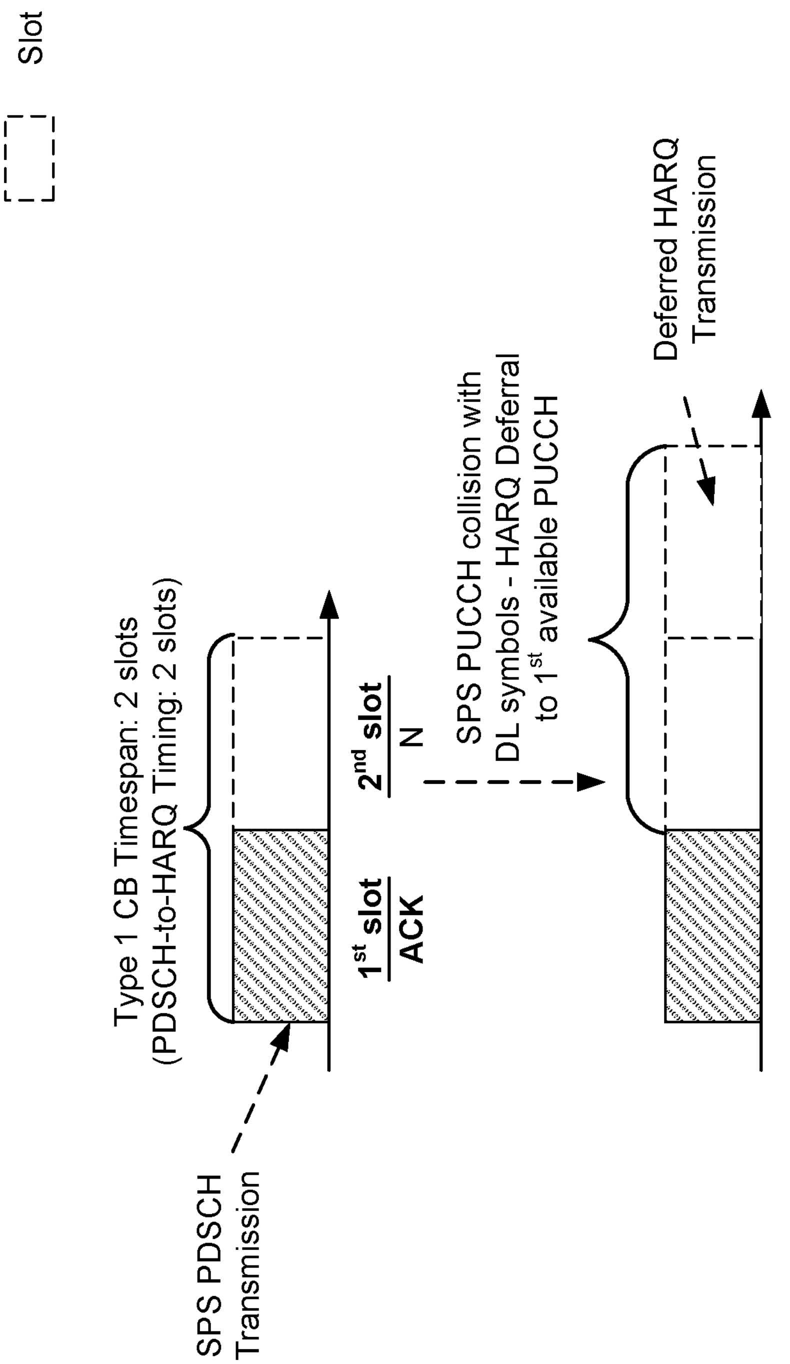
FIG. 8 is a diagram illustrating an example associated with an automatic extension of a type 1 codebook timespan, in accordance with the present disclosure.

FIG. 8 is a diagram illustrating an example 800 associated with an automatic extension of a type 1 codebook timespan, in accordance with the present disclosure.

In some aspects, a type 1 codebook timespan may initially be two slots, based at least in part on a PDSCH-to-HARQ timing of two slots. A first slot may be associated with an SPS PDSCH transmission. The SPS PDSCH transmission may be successful, so the SPS PDSCH transmission may be associated with an ACK. In a second slot, an SPS PUCCH, which may contain a HARQ ACK/NACK based at least in part on the SPS PDSCH transmission, may collide with downlink symbols. As a result, the HARQ ACK/NACK may be deferred to a first available PUCCH, which may occur in a third slot. A UE (e.g., UE 120) may transmit, to a network entity (e.g., base station 110), the HARQ ACK/NACK in the third slot.

In some aspects, the type 1 codebook timespan may not be static at two slots, but may instead be adapted to three slots. The type 1 codebook timespan may not correspond to the PDSCH-to-HARQ timing (which may be two slots). The type 1 codebook timespan may be extended based at least in part on a HARQ ACK/NACK deferral. In some aspects, an automatic extension of the type 1 codebook timespan may be configured via an RRC configuration.

In some aspects, the UE may transmit, to the network entity, an indication that the HARQ ACK/NACK associated with the SPS PDSCH transmission is a deferred HARQ ACK/NACK. As a result, the network entity may be notified that the HARQ ACK/NACK received from the UE is a deferred HARQ ACK/NACK. In some aspects, the UE may not automatically extend the type 1 codebook timespan, but rather may indicate to the network entity a starting downlink slot of a codebook, which may reduce an amount of signaling overhead.

As indicated above, FIG. 8 is provided as an example. Other examples may differ from what is described with regard to FIG. 8.

Figure 9:
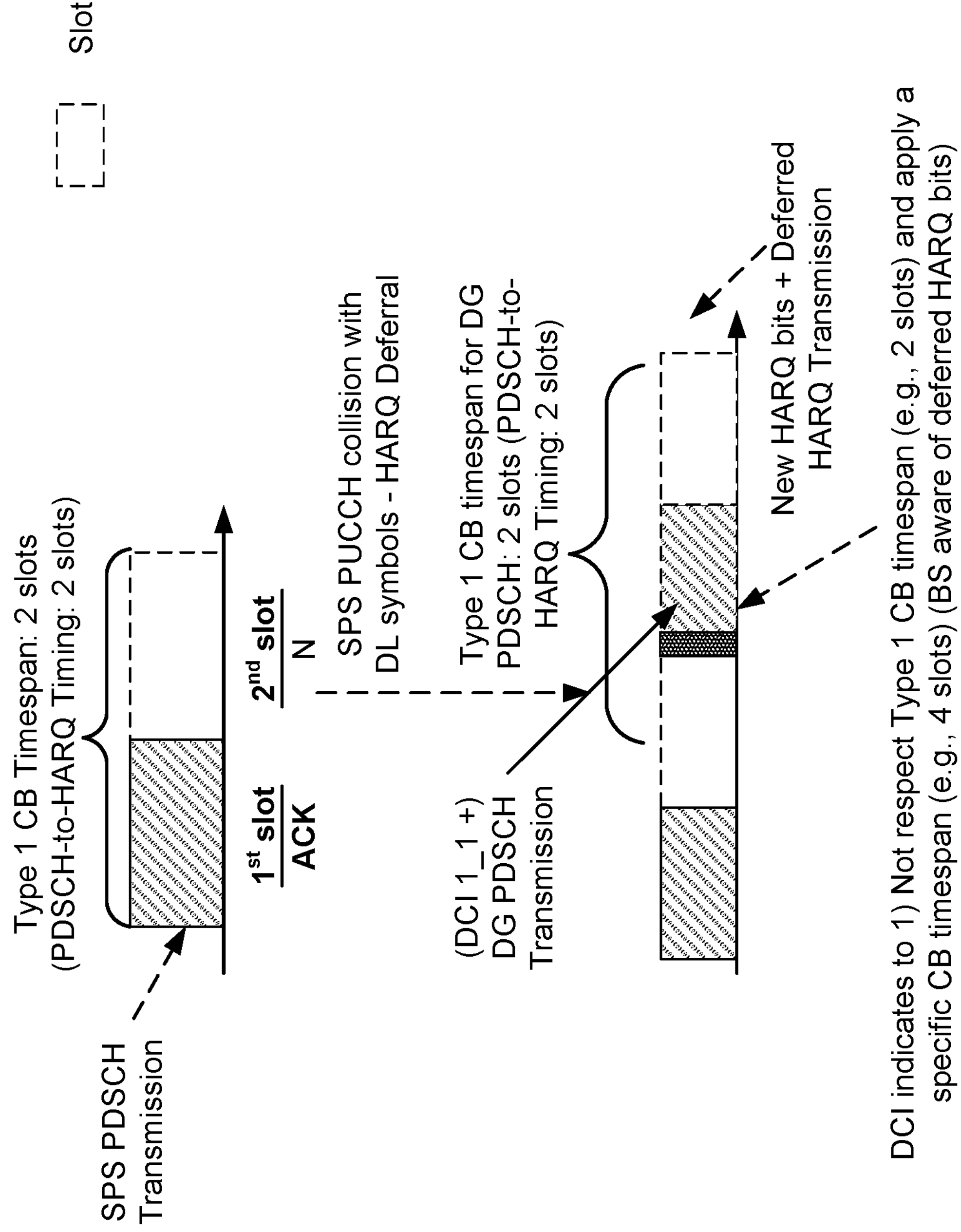
FIG. 9 is a diagram illustrating an example associated with multiplexing a deferred HARQ ACK/NACK with a new HARQ ACK/NACK, in accordance with the present disclosure.

FIG. 9 is a diagram illustrating an example 900 associated with multiplexing a deferred HARQ ACK/NACK with a new HARQ ACK/NACK, in accordance with the present disclosure.

In some aspects, a type 1 codebook timespan may initially be two slots, based at least in part on a PDSCH-to-HARQ timing of two slots. A first slot may be associated with an SPS PDSCH transmission. The SPS PDSCH transmission may be successful, so the SPS PDSCH transmission may be associated with an ACK. In a second slot, an SPS PUCCH, which may contain a HARQ ACK/NACK based at least in part on the SPS PDSCH transmission, may collide with downlink symbols, so the HARQ ACK/NACK may need to be deferred. In a third slot, a downlink grant PDSCH transmission may occur based at least in part on a DCI (e.g., DCI format 1_1). The downlink grant PDSCH transmission may also be associated with a type 1 codebook timespan of two slots based at least in part on a PDSCH-to-HARQ timing of two slots. In a fourth slot, a UE (e.g., UE 120) may transmit, to a network entity (e.g., base station 110), both a deferred HARQ ACK/NACK based at least in part on the SPS PDSCH transmission in the first slot and a new HARQ ACK/NACK based at least in part on the downlink grant PDSCH transmission in the third slot.

In some aspects, the network entity may transmit the DCI associated with the downlink grant PDSCH transmission, which may indicate, to the UE, that the UE should not respect an initial type 1 codebook timespan (e.g., two slots) and instead apply a specific codebook timespan (e.g., four slots). The network entity may indicate the specific codebook timespan based at least in part on an awareness that the HARQ ACK/NACK associated with the SPS PDSCH transmission has been deferred. In some aspects, the DCI may indicate that the initial type 1 codebook timespan should be extended to the specific codebook timespan when the deferred HARQ ACK/NACK is multiplexed with the new HARQ ACK/NACK associated with the downlink grant PDSCH transmission.

As indicated above, FIG. 9 is provided as an example. Other examples may differ from what is described with regard to FIG. 9.

In some aspects, a UE (e.g., UE 120) may receive, from a network entity (e.g., base station 120), a PDSCH transmission in a first slot. The PDSCH transmission may be an SPS PDSCH transmission or a downlink grant PDSCH transmission. The PDSCH transmission may be associated with a codebook timespan. The codebook timespan may be a type 1 codebook timespan. The UE may perform, to the network entity, a PUCCH transmission in a subsequent slot based at least in part on an adjustment to the codebook timespan. The PUCCH transmission may indicate a HARQ associated with the PDSCH transmission. The codebook timespan prior to the adjustment may be based at least in part on a PDSCH-to-HARQ timing.

In some aspects, the subsequent slot may be a third slot, and the PUCCH transmission may be unable to be performed in a second slot based at least in part on a collision with downlink symbols in the second slot. In some aspects, the PUCCH transmission may be a deferred PUCCH transmission. The PUCCH transmission may be deferred to a first available PUCCH resource. The first available PUCCH resource may be associated with the subsequent slot. In some aspects, the UE may transmit, to the network entity, an indication that the PUCCH transmission is associated with the deferred PUCCH transmission.

In some aspects, the UE may receive, from the network entity, an RRC configuration that configures the codebook timespan to be adjusted (e.g., extended). The UE may adjust the codebook timespan based at least in part on the RRC configuration.

In some aspects, the UE may receive, from the network entity, a downlink grant PDSCH transmission based at least in part on DCI, where the DCI may indicate the adjustment to the codebook timespan. The UE may transmit, to the network entity, the PUCCH transmission associated with the PDSCH transmission multiplexed with a PUCCH transmission associated with the downlink grant PDSCH transmission in the subsequent slot based at least in part on the adjustment to the codebook timespan. The PUCCH transmission may correspond to a deferred PUCCH transmission or a canceled PUCCH transmission in a slot between the first slot and the subsequent slot.

In some aspects, the UE may transmit, to the network entity, the PUCCH transmission associated with the PDSCH transmission multiplexed with a PUSCH retransmission in the subsequent slot based at least in part on the adjustment to the codebook timespan. In some aspects, the subsequent slot may be a third slot that occurs after the first slot, and the PUCCH transmission may be unable to be performed in a second slot after the first slot based at least in part on a cancelation of the PUCCH transmission in the second slot. The cancelation of the PUCCH transmission may be based at least in part on a conflicting higher priority PUCCH transmission.

Figure 10:
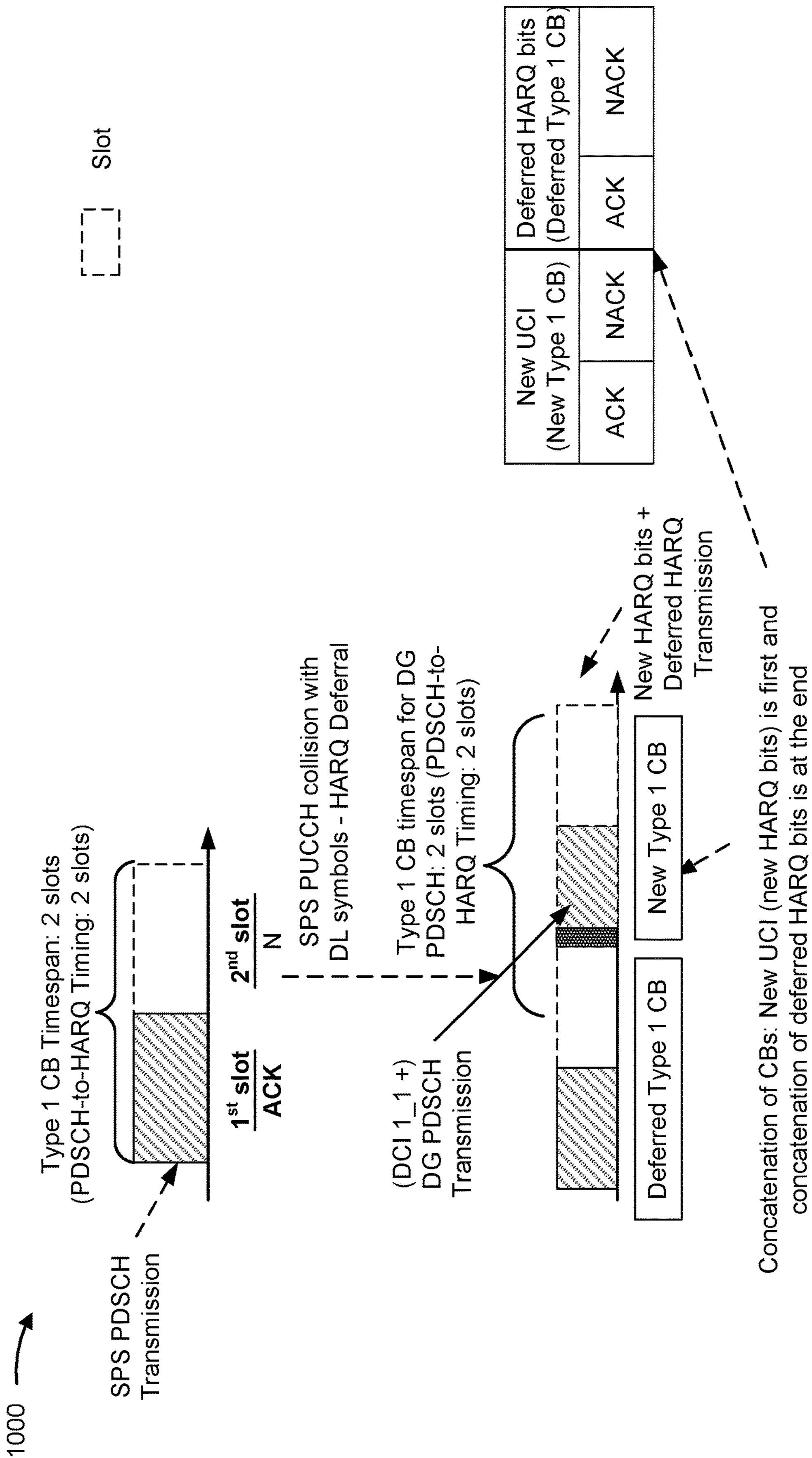
FIG. 10 is a diagram illustrating an example associated with a deferred HARQ ACK/NACK, in accordance with the present disclosure.

FIG. 10 is a diagram illustrating an example 1000 associated with a deferred HARQ ACK/NACK, in accordance with the present disclosure.

In some aspects, a type 1 codebook timespan may initially be two slots, based at least in part on a PDSCH-to-HARQ timing of two slots. A first slot may be associated with an SPS PDSCH transmission. The SPS PDSCH transmission may be successful, so the SPS PDSCH transmission may be associated with an ACK. In a second slot, an SPS PUCCH transmission, which may contain a HARQ ACK/NACK based at least in part on the SPS PDSCH transmission, may collide with downlink symbols, so the HARQ ACK/NACK may need to be deferred. In a third slot, a downlink grant PDSCH transmission may occur (e.g., based at least in part on DCI format 1_1). The downlink grant PDSCH transmission may also be associated with a type 1 codebook timespan of two slots based at least in part on a PDSCH-to-HARQ timing of two slots. In a fourth slot, a UE (e.g., UE 120) may transmit both a deferred HARQ ACK/NACK based at least in part on the SPS PDSCH transmission in the first slot and new HARQ ACK/NACK based at least in part on the downlink grant PDSCH transmission in the third slot.

In some aspects, the first slot and the second slot may be associated with a deferred type 1 codebook, and the third slot and the fourth slot may be associated with a new type 1 codebook. In some aspects, in the fourth slot, the UE may transmit the new HARQ ACK/NACK (or new uplink control information (UCI)) associated with the new type 1 codebook and the deferred HARQ ACK/NACK associated with the deferred type 1 codebook. The new HARQ ACK/NACK may indicate one or more HARQ bits. The deferred HARQ ACK/NACK may indicate one or more HARQ bits. In some aspects, the UE may transmit the new HARQ ACK/NACK and the deferred HARQ ACK/NACK based at least in part on a concatenation of codebooks, where the new HARQ ACK/NACK may be first and a concatenation of the deferred HARQ ACK/NACK may be at an end. The new HARQ ACK/NACK may be multiplexed with the deferred HARQ ACK/NACK.

As indicated above, FIG. 10 is provided as an example. Other examples may differ from what is described with regard to FIG. 10.

Figure 11:
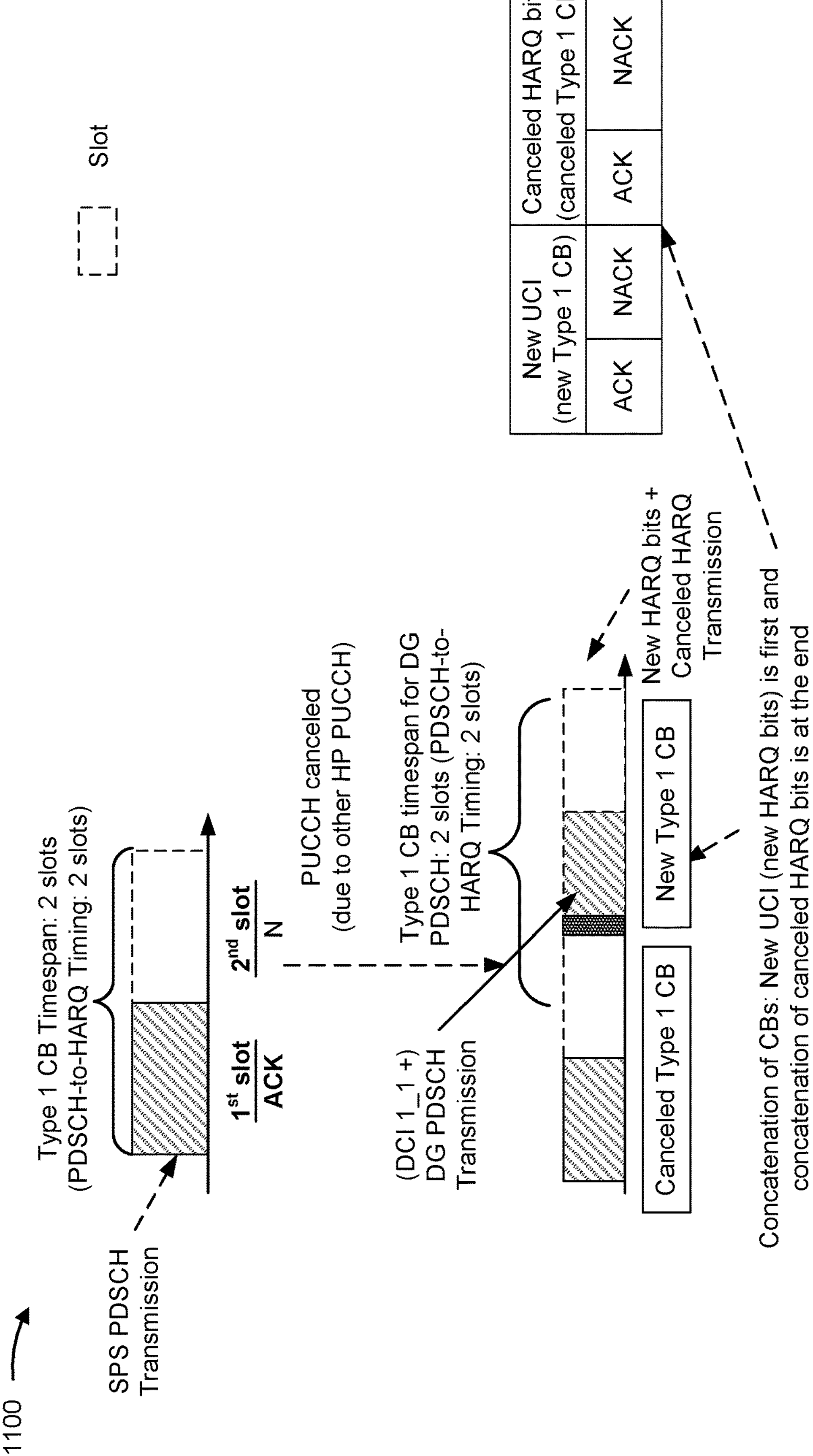
FIG. 11 is a diagram illustrating an example associated with a canceled HARQ ACK/NACK, in accordance with the present disclosure.

FIG. 11 is a diagram illustrating an example 1100 associated with a canceled HARQ ACK/NACK, in accordance with the present disclosure.

In some aspects, a type 1 codebook timespan may initially be two slots, based at least in part on a PDSCH-to-HARQ timing of two slots. A first slot may be associated with a downlink grant PDSCH transmission. The downlink grant PDSCH transmission may be successful, so the downlink grant PDSCH transmission may be associated with an ACK. In a second slot, a PUCCH transmission, which may contain a HARQ ACK/NACK based at least in part on the downlink grant PDSCH transmission, may be canceled based at least in part on a higher priority PUCCH transmission. In a third slot, a downlink grant PDSCH transmission may occur (e.g., based at least in part on DCI format 1_1). The downlink grant PDSCH transmission may also be associated with a type 1 codebook timespan of two slots based at least in part on a PDSCH-to-HARQ timing of two slots. In a fourth slot, a UE (e.g., UE 120) may transmit both a canceled HARQ ACK/NACK based at least in part on the downlink grant PDSCH transmission in the first slot and new HARQ ACK/NACK based at least in part on the downlink grant PDSCH transmission in the third slot.

In some aspects, the first slot and the second slot may be associated with a canceled type 1 codebook, and the third slot and the fourth slot may be associated with a new type 1 codebook. In some aspects, in the fourth slot, the UE may transmit the new HARQ ACK/NACK (or new UCI) associated with the new type 1 codebook and the canceled HARQ ACK/NACK associated with the canceled type 1 codebook. The new HARQ ACK/NACK may indicate one or more HARQ bits. The canceled HARQ ACK/NACK may indicate one or more HARQ bits. In some aspects, the UE may transmit the new HARQ ACK/NACK and the canceled HARQ ACK/NACK based at least in part on a concatenation of codebooks, where the new HARQ ACK/NACK may be first and a concatenation of the canceled HARQ ACK/NACK may be at an end. The new HARQ ACK/NACK may be multiplexed with the canceled HARQ ACK/NACK.

As indicated above, FIG. 11 is provided as an example. Other examples may differ from what is described with regard to FIG. 11.

Figure 12:
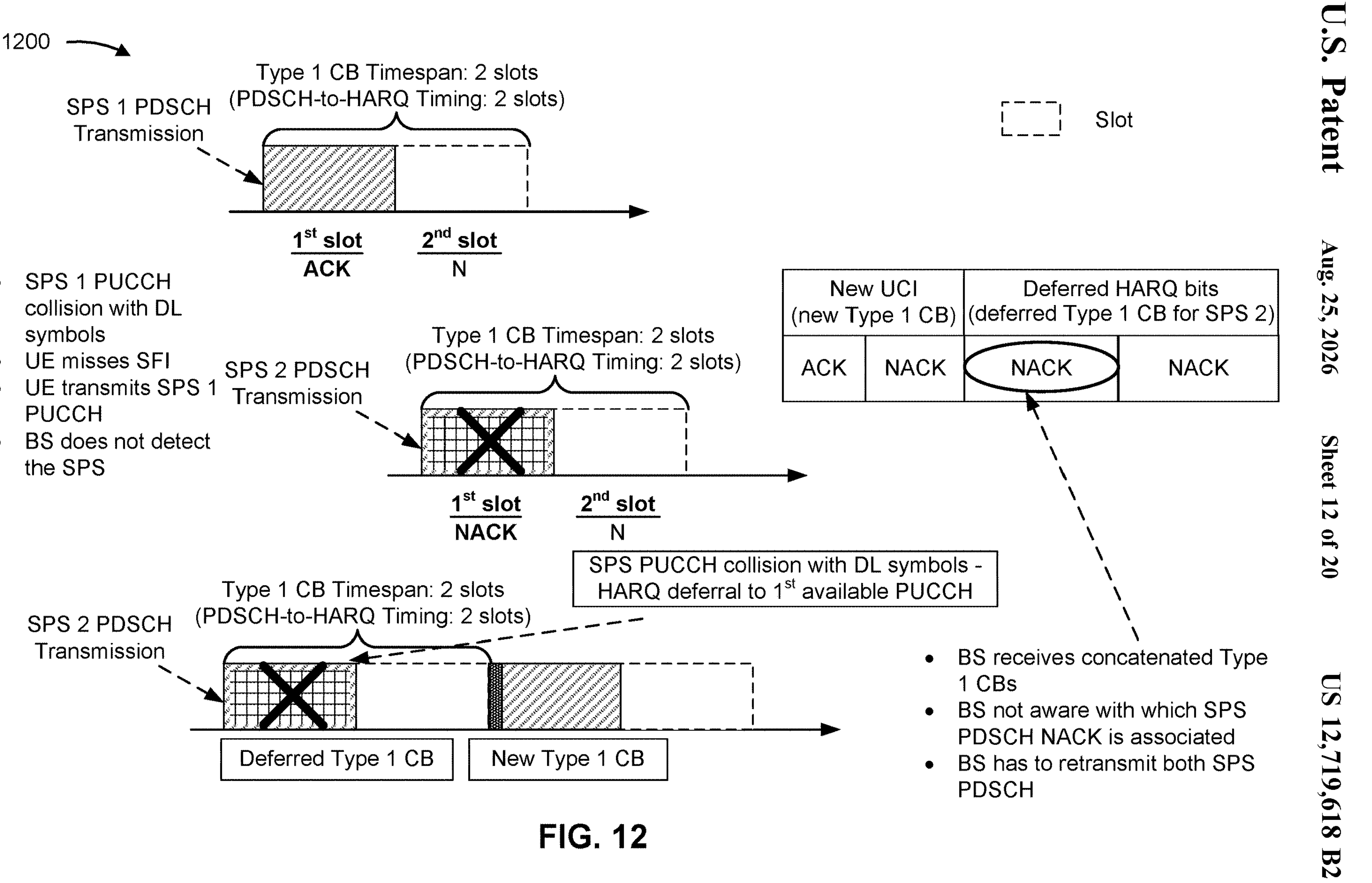
FIG. 12 is a diagram illustrating an example associated with multiple deferred HARQ ACK/NACKs, in accordance with the present disclosure.

FIG. 12 is a diagram illustrating an example 1200 associated with multiple deferred HARQ ACK/NACKs, in accordance with the present disclosure.

In some aspects, a type 1 codebook timespan may be two slots, based at least in part on a PDSCH-to-HARQ timing of two slots. A first slot may be associated with a first SPS PDSCH transmission. The first SPS PDSCH transmission may be successful, so the first SPS PDSCH transmission may be associated with an ACK. In a second slot, a first SPS PUCCH transmission, which may contain a HARQ ACK/NACK based at least in part on the first SPS PDSCH transmission, may collide with downlink symbols. As a result, the HARQ ACK/NACK may be deferred to a first available PUCCH.

In some aspects, a UE (e.g., UE 120) may miss a slot format indicator (SFI), and the UE may transmit, to a network entity (e.g., base station 110), the HARQ ACK/NACK in the first available PUCCH. However, since the UE missed the SFI, the network entity may not detect the first SPS PUCCH transmission containing the HARQ ACK/NACK. A second SPS PDSCH transmission may occur in a third slot. The second SPS PDSCH transmission may not be successful, so the second SPS PDSCH transmission may be associated with a NACK. A second SPS PUCCH transmission, which may contain a HARQ ACK/NACK based at least in part on the second SPS PDSCH transmission, may collide with downlink symbols in a fourth slot, so the HARQ ACK/NACK may need to be deferred to the first available PUCCH.

In some aspects, in a fifth slot, a downlink grant PDSCH transmission may occur (e.g., based at least in part on DCI format 1_1). The downlink grant PDSCH transmission may also be associated with a type 1 codebook timespan of two slots based at least in part on a PDSCH-to-HARQ timing of two slots.

In some aspects, the third slot and the fourth slot may be associated with a deferred type 1 codebook, and the fifth slot and the sixth slot may be associated with a new type 1 codebook. In some aspects, in the sixth slot, the UE may transmit, to the network entity, the new HARQ ACK/NACK (or new UCI) associated with the new type 1 codebook and the deferred HARQ ACK/NACK associated with the deferred type 1 codebook. The deferred HARQ ACK/NACK may be associated with the second SPS PDSCH transmission (associated with the NACK). The new HARQ ACK/NACK may indicate one or more HARQ bits. The deferred HARQ ACK/NACK may indicate one or more HARQ bits. The UE may transmit the new HARQ ACK/NACK and the deferred HARQ ACK/NACK as concatenated type 1 codebooks.

However, the network entity receiving the deferred HARQ ACK/NACK may be unable to determine whether the deferred HARQ ACK/NACK is associated with the first SPS PDSCH transmission or the second SPS PDSCH transmission. The network entity may expect to receive three codebooks from the UE (e.g., corresponding to the first SPS PDSCH transmission, the second SPS PDSCH transmission, and the downlink grant PDSCH transmission), but may instead receive only two codebooks from the UE (e.g., the deferred type 1 codebook associated with the second SPS PDSCH transmission and the new type 1 codebook). The UE may not receive a deferred type 1 codebook associated with the first SPS PDSCH transmission. As a result, the network entity may need to retransmit both the first SPS PDSCH transmission and the second SPS PDSCH transmission, thereby increasing an amount of signaling between the network entity and the UE.

In some aspects, when codebook concatenation is supported, the UE may not apply a concatenation of more than one deferred type 1 codebook or canceled type 1 codebook to the new type 1 codebook. For example, the UE may not apply the concatenation to two deferred type 1 codebooks or two canceled type 1 codebooks to the new type 1 codebook. In some aspects, in the case of more than one deferred type 1 codebook and/or canceled type 1 codebook, the UE may concatenate only an earliest deferred type 1 codebook or an earliest canceled type 1 codebook to the new type 1 codebook. As a result, the network entity may not need to retransmit SPS PDSCH transmissions, thereby avoiding the increase in the amount of signaling between the network entity and the UE.

In some aspects, an additional field, identifier, or counter may be added in each deferred type 1 codebook or canceled type 1 codebook, which may enable a network entity to keep track of ACKs or NACKs in the case of multiple deferred PUCCH transmissions. For example, the additional field, identifier, or counter may enable the network entity to associate different ACKs/NACKs with different SPS PDSCH transmissions.

As indicated above, FIG. 12 is provided as an example. Other examples may differ from what is described with regard to FIG. 12.

Figure 13:
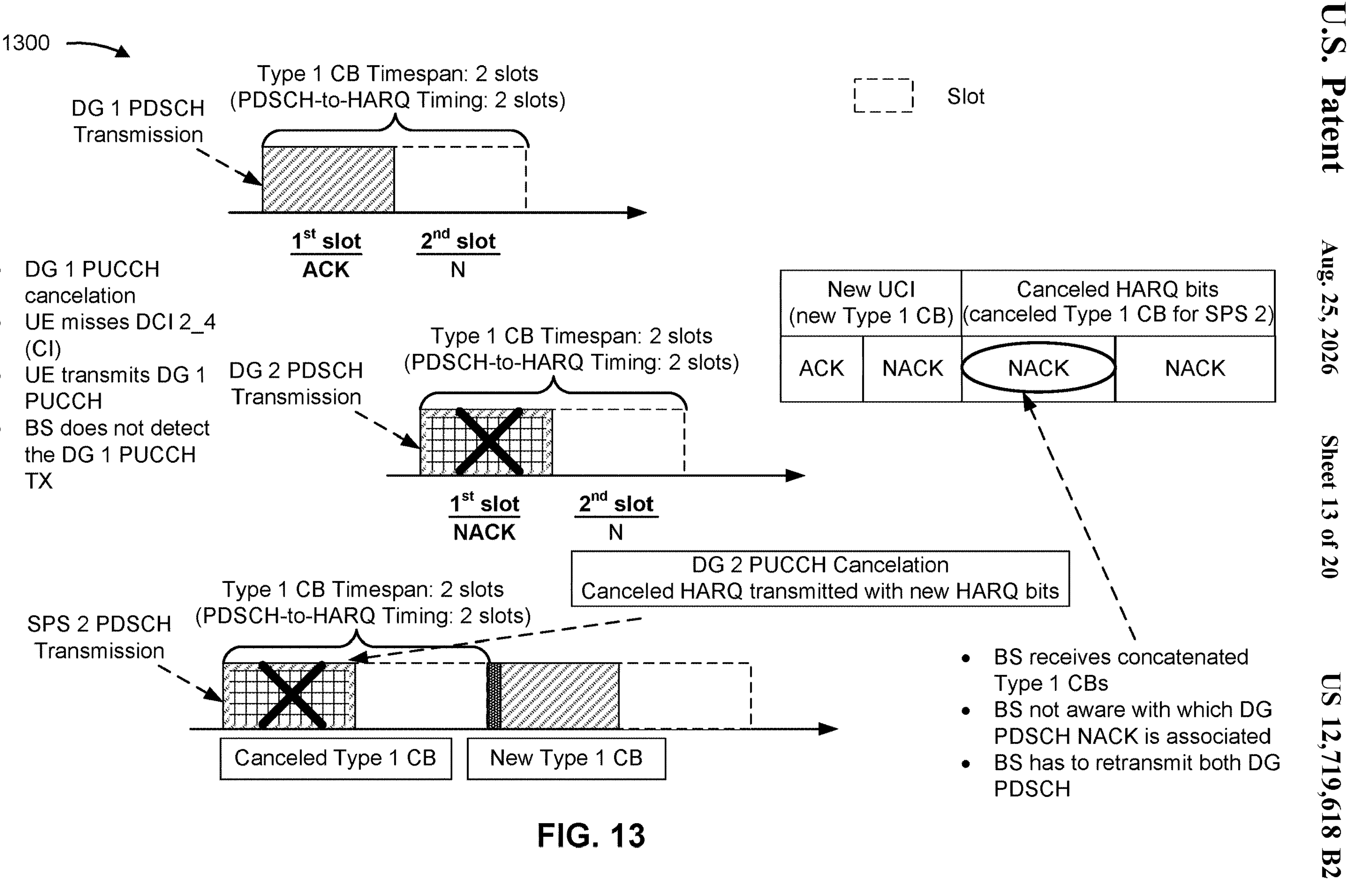
FIG. 13 is a diagram illustrating an example associated with multiple canceled HARQ ACK/NACKs, in accordance with the present disclosure.

FIG. 13 is a diagram illustrating an example 1300 associated with multiple canceled HARQ ACK/NACKs, in accordance with the present disclosure.

In some aspects, a type 1 codebook timespan may be two slots, based at least in part on a PDSCH-to-HARQ timing of two slots. A first slot may be associated with a first downlink grant PDSCH transmission. The first downlink grant PDSCH transmission may be successful, so the first downlink grant PDSCH transmission may be associated with an ACK. In a second slot, a first downlink grant PUCCH transmission, which may contain a HARQ ACK/NACK based at least in part on the first downlink grant PDSCH transmission, may be canceled. A UE (e.g., UE 120) may miss a cancelation indication (e.g., via a DCI format 2_4) transmitted by a network entity (e.g., base station 120). The UE may perform a first downlink grant PUCCH transmission, but the network entity may not detect the first downlink grant PUCCH transmission based at least in part on the cancelation indication.

A second downlink grant PDSCH transmission may occur in a third slot. The second downlink grant PDSCH transmission may not be successful, so the second downlink grant PDSCH transmission may be associated with a NACK. A second downlink grant PUCCH transmission, which may contain a HARQ ACK/NACK based at least in part on the second downlink grant PDSCH transmission, may be canceled.

In some aspects, in a fifth slot, a third downlink grant PDSCH transmission may occur (e.g., based at least in part on DCI format 1_1). The third downlink grant PDSCH transmission may also be associated with a type 1 codebook timespan of two slots based at least in part on a PDSCH-to-HARQ timing of two slots.

In some aspects, the third slot and the fourth slot may be associated with a canceled type 1 codebook, and the fifth slot and the sixth slot may be associated with a new type 1 codebook. In some aspects, in the sixth slot, the UE may transmit, to the network entity, the new HARQ ACK/NACK (or new UCI) associated with the new type 1 codebook and the canceled HARQ ACK/NACK associated with the canceled type 1 codebook. The canceled HARQ ACK/NACK may be associated with the second downlink grant PDSCH transmission (associated with the NACK). The new HARQ ACK/NACK may indicate one or more HARQ bits. The canceled HARQ ACK/NACK may indicate one or more HARQ bits. The UE may transmit the new HARQ ACK/NACK and the canceled HARQ ACK/NACK as concatenated type 1 codebooks.

However, the network entity receiving the canceled HARQ ACK/NACK may be unable to determine whether the canceled HARQ ACK/NACK is associated with the first downlink grant PDSCH transmission or the second downlink grant PDSCH transmission. The network entity may expect to receive three codebooks from the UE (e.g., corresponding to the first downlink grant PDSCH transmission, the second downlink grant PDSCH transmission, and the third downlink grant PDSCH transmission), but may instead receive only two codebooks from the UE (e.g., the canceled type 1 codebook associated with the second downlink grant PDSCH transmission and the new type 1 codebook). The UE may not receive a canceled type 1 codebook associated with the first downlink grant PDSCH transmission. As a result, the network entity may need to retransmit both the first downlink grant PDSCH transmission and the second downlink grant PDSCH transmission, thereby increasing an amount of signaling between the network entity and the UE.

In some aspects, when codebook concatenation is supported, the UE may not apply a concatenation of more than one deferred type 1 codebook or canceled type 1 codebook to the new type 1 codebook. For example, the UE may not apply the concatenation to two deferred type 1 codebooks or two canceled type 1 codebooks to the new type 1 codebook. In some aspects, in the case of more than one deferred type 1 codebook and/or canceled type 1 codebook, the UE may concatenate only an earliest deferred type 1 codebook or an earliest canceled type 1 codebook to the new type 1 codebook. As a result, the network entity may not need to retransmit downlink grant PDSCH transmissions, thereby avoiding the increase in the amount of signaling between the network entity and the UE.

In some aspects, an additional field, identifier, or counter may be added in each deferred type 1 codebook or canceled type 1 codebook, which may enable a network entity to keep track of ACKs or NACKs in the case of multiple canceled PUCCH transmissions. For example, the additional field, identifier, or counter may enable the network entity to associate different ACKs/NACKs with different downlink grant PDSCH transmissions.

As indicated above, FIG. 13 is provided as an example. Other examples may differ from what is described with regard to FIG. 13.

In some aspects, a UE (e.g., UE 120) may receive, from a network entity (e.g., base station 110), a configuration associated with a codebook, such as an RRC configuration. The codebook may be a type 1 codebook. The UE may perform, to the network entity, a PUCCH transmission based at least in part on the configuration, where the PUCCH transmission may indicate a HARQ associated with a PDSCH transmission.

In some aspects, the PDSCH transmission may be an SPS PDSCH transmission and the PUCCH transmission may be a deferred PUCCH transmission. The configuration may be associated with not using the codebook based at least in part on the SPS PDSCH transmission configured with the deferred PUCCH transmission. In other words, the configuration may be associated with not using a type 1 codebook for the SPS PDSCH transmission configured with the deferred PUCCH transmission.

In some aspects, the PUCCH transmission may be associated with a downlink grant PDSCH transmission or an SPS PDSCH transmission. The configuration may be associated with not using the codebook based at least in part on the PUCCH transmission being multiplexed with a PUSCH transmission. In other words, the configuration may be associated with not using a type 1 codebook for a downlink grant or SPS PDSCH HARQ multiplexed with the PUSCH transmission, since the downlink grant or SPS PDSCH HARQ may be canceled together with the PUSCH transmission.

In some aspects, the configuration may indicate that different uplink and downlink slot sizes are not configured for the codebook based at least in part on the PDSCH transmission being an SPS PDSCH transmission with a deferred PUCCH transmission, or based at least in part on the PUCCH transmission having a likelihood of cancelation that satisfies a threshold. In other words, the configuration may be associated with not configuring a different uplink and downlink slot (or sub-slot) size for a type 1 codebook for the SPS PDSCH transmission with the deferred PUCCH transmission, or for an SPS PDSCH HARQ that is susceptible to cancelation. In some aspects, a type 1 HARQ codebook may be difficult to manage upon a sub-slot configuration of different uplink and downlink sub-slot sizes in a presence of deferred and/or canceled PUCCH transmissions.

In some aspects, the PUCCH transmission may be associated with a deferred codebook or a canceled codebook. The configuration may prevent more than one deferred codebook or canceled codebook from being concatenated with a codebook associated with a second PDSCH transmission.

In some aspects, the PUCCH transmission may be associated with a deferred codebook or a canceled codebook, where more than one deferred codebook or canceled codebook may be configured to be concatenated with a codebook associated with a second PDSCH transmission. An earliest deferred codebook or an earliest canceled codebook from the more than one deferred codebook or canceled codebook may be configured to be concatenated with the codebook associated with the second PDSCH transmission.

In some aspects, the configuration may enable an additional field to be added in each deferred codebook or canceled codebook, based at least in part on more than one codebook being concatenated with a codebook associated with a second PDSCH transmission. The PUCCH transmission may be based at least in part on the additional field. In some aspects, an additional field, identifier, or counter may be added in each deferred type 1 codebook or canceled type 1 codebook, which may enable a network entity to keep track of ACKs or NACKs in the case of multiple deferred PUCCH transmissions and/or multiple canceled PUCCH transmissions.

In some aspects, during a type 1 HARQ-ACK codebook determination, $$N_c^{DL}$$

may be a value that is set to a quantity of downlink slots (which may correspond to a codebook timespan) for SPS PDSCH reception on a serving cell c with HARQ-ACK information (including both deferred HARQ-ACK and non-deferred HARQ-ACK, as well as previously cancelled HARQ bits) multiplexed on a PUCCH. The HARQ-ACK information may correspond to a PUCCH transmission. The deferred HARQ-ACK may correspond to a deferred PUCCH transmission. The cancelled HARQ bits may correspond to a canceled PUCCH transmission. A type 1 HARQ-ACK codebook determination may be based at least in part on the $$N_c^{DL}$$

value.

Figure 14:
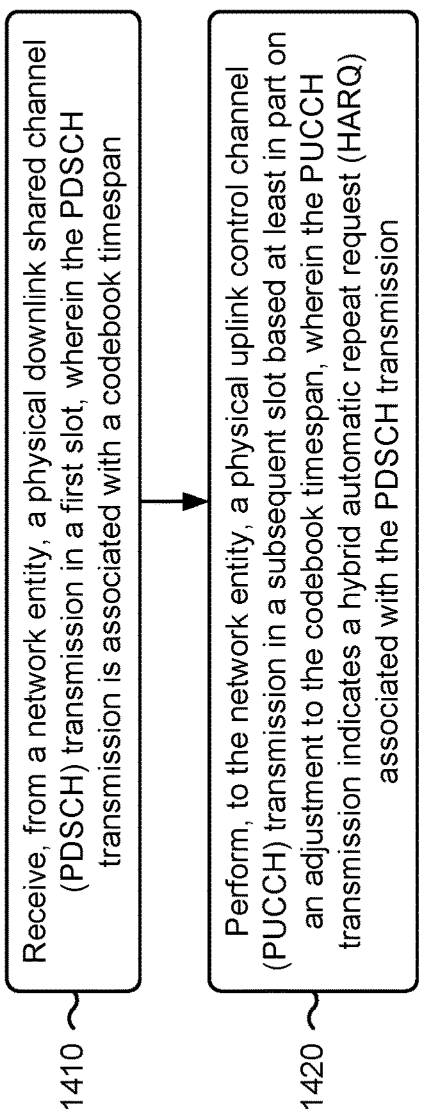
FIGS. 14-17 are diagrams illustrating example processes associated with performing uplink transmissions according to codebook timespans, in accordance with the present disclosure.
Figure 14:

FIG. 14 is a diagram illustrating an example process 1400 performed, for example, by a UE, in accordance with the present disclosure. Example process 1400 is an example where the UE (e.g., UE 120) performs operations associated with performing uplink transmissions according to codebook timespans.

As shown in FIG. 14, in some aspects, process 1400 may include receiving, from a network entity, a PDSCH transmission in a first slot, wherein the PDSCH transmission is associated with a codebook timespan (block 1410). For example, the UE (e.g., using communication manager 140 and/or reception component 1802, depicted in FIG. 18) may receive, from a network entity, a PDSCH transmission in a first slot, wherein the PDSCH transmission is associated with a codebook timespan, as described above.

As further shown in FIG. 14, in some aspects, process 1400 may include performing, to the network entity, a PUCCH transmission in a subsequent slot based at least in part on an adjustment to the codebook timespan, wherein the PUCCH transmission indicates a HARQ associated with the PDSCH transmission (block 1420). For example, the UE (e.g., using communication manager 140 and/or transmission component 1804, depicted in FIG. 18) may perform, to the network entity, a PUCCH transmission in a subsequent slot based at least in part on an adjustment to the codebook timespan, wherein the PUCCH transmission indicates a HARQ associated with the PDSCH transmission, as described above.

Process 1400 may include additional aspects, such as any single aspect or any combination of aspects described below and/or in connection with one or more other processes described elsewhere herein.

In a first aspect, the PDSCH transmission is an SPS PDSCH transmission.

In a second aspect, alone or in combination with the first aspect, the codebook timespan is a type 1 codebook timespan, and the codebook timespan prior to the adjustment is based at least in part on a PDSCH-to-HARQ timing.

In a third aspect, alone or in combination with one or more of the first and second aspects, the subsequent slot is a third slot, and the PUCCH transmission cannot be performed in a second slot based at least in part on a collision with downlink symbols in the second slot.

In a fourth aspect, alone or in combination with one or more of the first through third aspects, the PUCCH transmission is a deferred PUCCH transmission, wherein the PUCCH transmission is deferred to a first available PUCCH resource, and the first available PUCCH resource is associated with the subsequent slot.

In a fifth aspect, alone or in combination with one or more of the first through fourth aspects, process 1400 includes transmitting, to the network entity, an indication that the PUCCH transmission is associated with a deferred PUCCH transmission.

In a sixth aspect, alone or in combination with one or more of the first through fifth aspects, process 1400 includes receiving, from the network entity, an RRC that enables the codebook timespan to be adjusted.

In a seventh aspect, alone or in combination with one or more of the first through sixth aspects, the PDSCH transmission is a downlink grant PDSCH transmission.

In an eighth aspect, alone or in combination with one or more of the first through seventh aspects, process 1400 includes receiving, from the network entity, a downlink grant PDSCH transmission based at least in part on DCI, wherein the DCI indicates the adjustment to the codebook timespan, and transmitting, to the network entity, the PUCCH transmission associated with the PDSCH transmission multiplexed with a PUCCH transmission associated with the downlink grant PDSCH transmission in the subsequent slot based at least in part on the adjustment to the codebook timespan, wherein the PUCCH transmission corresponds to a deferred PUCCH transmission or a canceled PUCCH transmission in a slot between the first slot and the subsequent slot.

In a ninth aspect, alone or in combination with one or more of the first through eighth aspects, process 1400 includes transmitting, to the network entity, the PUCCH transmission associated with the PDSCH transmission multiplexed with a PUSCH retransmission in the subsequent slot based at least in part on the adjustment to the codebook timespan.

In a tenth aspect, alone or in combination with one or more of the first through ninth aspects, the subsequent slot is a third slot, and the PUCCH transmission cannot be performed in a second slot based at least in part on a cancelation of the PUCCH transmission in the second slot, wherein the cancelation of the PUCCH transmission is based at least in part on a conflicting higher priority PUCCH transmission.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
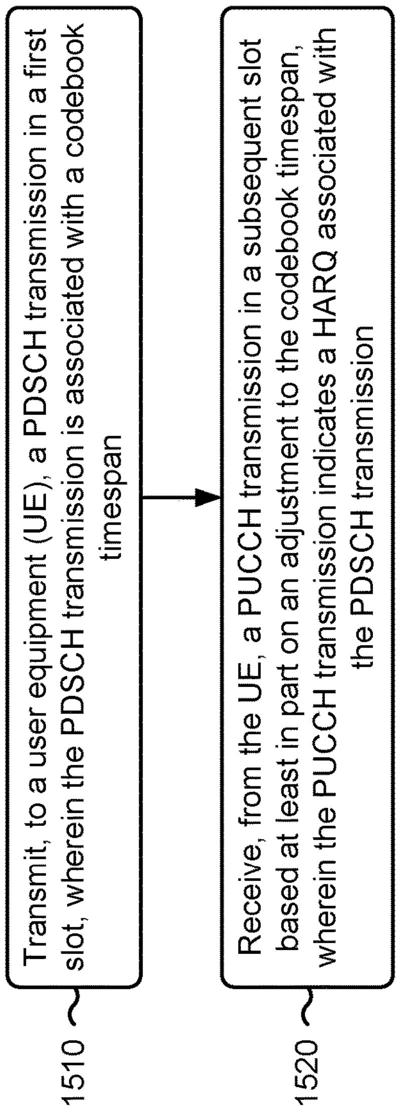
Figure 15:

FIG. 15 is a diagram illustrating an example process 1500 performed, for example, by a network entity, in accordance with the present disclosure. Example process 1500 is an example where the network entity (e.g., base station 110) performs operations associated with performing uplink transmissions according to codebook timespans.

As shown in FIG. 15, in some aspects, process 1500 may include transmitting, to a UE, a PDSCH transmission in a first slot, wherein the PDSCH transmission is associated with a codebook timespan (block 1510). For example, the network entity (e.g., using communication manager 150 and/or transmission component 1904, depicted in FIG. 19) may transmit, to a UE, a PDSCH transmission in a first slot, wherein the PDSCH transmission is associated with a codebook timespan, as described above.

As further shown in FIG. 15, in some aspects, process 1500 may include receiving, from the UE, a PUCCH transmission in a subsequent slot based at least in part on an adjustment to the codebook timespan, wherein the PUCCH transmission indicates a HARQ associated with the PDSCH transmission (block 1520). For example, the network entity (e.g., using communication manager 150 and/or reception component 1902, depicted in FIG. 19) may receive, from the UE, a PUCCH transmission in a subsequent slot based at least in part on an adjustment to the codebook timespan, wherein the PUCCH transmission indicates a HARQ associated with the PDSCH transmission, as described above.

Process 1500 may include additional aspects, such as any single aspect or any combination of aspects described below and/or in connection with one or more other processes described elsewhere herein.

In a first aspect, the PDSCH transmission is an SPS PDSCH transmission.

In a second aspect, alone or in combination with the first aspect, the codebook timespan is a type 1 codebook timespan, and the codebook timespan prior to the adjustment is based at least in part on a PDSCH-to-HARQ timing.

In a third aspect, alone or in combination with one or more of the first and second aspects, the subsequent slot is a third slot, and the PUCCH transmission cannot be performed in a second slot based at least in part on a collision with downlink symbols in the second slot.

In a fourth aspect, alone or in combination with one or more of the first through third aspects, the PUCCH transmission is a deferred PUCCH transmission, wherein the PUCCH transmission is deferred to a first available PUCCH resource, and the first available PUCCH resource is associated with the subsequent slot.

In a fifth aspect, alone or in combination with one or more of the first through fourth aspects, process 1500 includes receiving, from the UE, an indication that the PUCCH transmission is associated with a deferred PUCCH transmission.

In a sixth aspect, alone or in combination with one or more of the first through fifth aspects, process 1500 includes transmitting, to the UE, an RRC configuration that enables the codebook timespan to be adjusted.

In a seventh aspect, alone or in combination with one or more of the first through sixth aspects, the PDSCH transmission is a downlink grant PDSCH transmission.

In an eighth aspect, alone or in combination with one or more of the first through seventh aspects, process 1500 includes transmitting, to the UE, a downlink grant PDSCH transmission based at least in part on DCI, wherein the DCI indicates the adjustment to the codebook timespan, and receiving, from the UE, the PUCCH transmission associated with the PDSCH transmission multiplexed with a PUCCH transmission associated with the downlink grant PDSCH transmission in the subsequent slot based at least in part on the adjustment to the codebook timespan, wherein the PUCCH transmission corresponds to a deferred PUCCH transmission or a canceled PUCCH transmission in a slot between the first slot and the subsequent slot.

In a ninth aspect, alone or in combination with one or more of the first through eighth aspects, process 1500 includes receiving, from the UE, the PUCCH transmission associated with the PDSCH transmission multiplexed with a PUSCH retransmission in the subsequent slot based at least in part on the adjustment to the codebook timespan.

In a tenth aspect, alone or in combination with one or more of the first through ninth aspects, the subsequent slot is a third slot, wherein the PUCCH transmission cannot be performed in a second slot based at least in part on a cancelation of the PUCCH transmission in the second slot, and the cancelation of the PUCCH transmission is based at least in part on a conflicting higher priority PUCCH transmission.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
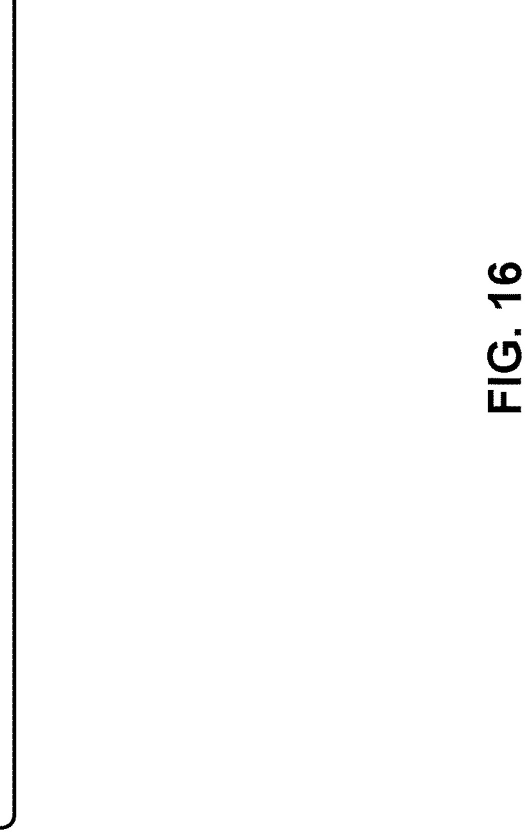

FIG. 16 is a diagram illustrating an example process 1600 performed, for example, by a UE, in accordance with the present disclosure. Example process 1600 is an example where the UE (e.g., UE 120) performs operations associated with performing uplink transmissions according to codebook timespans.

As shown in FIG. 16, in some aspects, process 1600 may include receiving, from a network entity, a configuration associated with a codebook, wherein the codebook is a type 1 codebook (block 1610). For example, the UE (e.g., using communication manager 140 and/or reception component 1802, depicted in FIG. 18) may receive, from a network entity, a configuration associated with a codebook, wherein the codebook is a type 1 codebook, as described above.

As further shown in FIG. 16, in some aspects, process 1600 may include performing, to the network entity, a PUCCH transmission based at least in part on the configuration, wherein the PUCCH transmission indicates a HARQ associated with a PDSCH transmission (block 1620). For example, the UE (e.g., using communication manager 140 and/or transmission component 1804, depicted in FIG. 18) may perform, to the network entity, a PUCCH transmission based at least in part on the configuration, wherein the PUCCH transmission indicates a HARQ associated with a PDSCH transmission, as described above.

Process 1600 may include additional aspects, such as any single aspect or any combination of aspects described below and/or in connection with one or more other processes described elsewhere herein.

In a first aspect, the PDSCH transmission is an SPS PDSCH transmission and the PUCCH transmission is a deferred PUCCH transmission, and the configuration is associated with not using the codebook based at least in part on the SPS PDSCH transmission configured with the deferred PUCCH transmission.

In a second aspect, alone or in combination with the first aspect, the PUCCH transmission is associated with a downlink grant PDSCH transmission or an SPS PDSCH transmission, and the configuration is associated with not using the codebook based at least in part on the PUCCH transmission being multiplexed with a PUSCH transmission.

In a third aspect, alone or in combination with one or more of the first and second aspects, the configuration indicates that different uplink and downlink slot sizes are not configured for the codebook based at least in part on the PDSCH transmission being an SPS PDSCH transmission with a deferred PUCCH transmission, or based at least in part on the PUCCH transmission having a likelihood of cancelation that satisfies a threshold.

In a fourth aspect, alone or in combination with one or more of the first through third aspects, the PUCCH transmission is associated with a deferred codebook or a canceled codebook, and the configuration prevents more than one deferred codebook or canceled codebook from being concatenated with a codebook associated with a second PDSCH transmission.

In a fifth aspect, alone or in combination with one or more of the first through fourth aspects, the PUCCH transmission is associated with a deferred codebook or a canceled codebook, wherein more than one deferred codebook or canceled codebook is configured to be concatenated with a codebook associated with a second PDSCH transmission, and an earliest deferred codebook or an earliest canceled codebook from the more than one deferred codebook or canceled codebook is configured to be concatenated with the codebook associated with the second PDSCH transmission.

In a sixth aspect, alone or in combination with one or more of the first through fifth aspects, the configuration enables an additional field to be added in each deferred codebook or canceled codebook, based at least in part on more than one codebook being concatenated with a codebook associated with a second PDSCH transmission, and the PUCCH transmission is based at least in part on the additional field.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
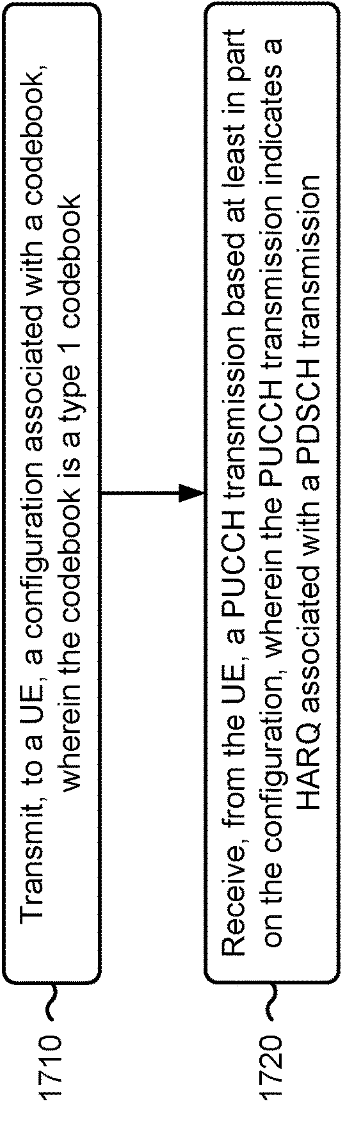

FIG. 17 is a diagram illustrating an example process 1700 performed, for example, by a network entity, in accordance with the present disclosure. Example process 1700 is an example where the network entity (e.g., base station 110) performs operations associated with performing uplink transmissions according to codebook timespans.

As shown in FIG. 17, in some aspects, process 1700 may include transmitting, to a UE, a configuration associated with a codebook, wherein the codebook is a type 1 codebook (block 1710). For example, the network entity (e.g., using communication manager 150 and/or transmission component 1904, depicted in FIG. 19) may transmit, to a UE, a configuration associated with a codebook, wherein the codebook is a type 1 codebook, as described above.

As further shown in FIG. 17, in some aspects, process 1700 may include receiving, from the UE, a PUCCH transmission based at least in part on the configuration, wherein the PUCCH transmission indicates a HARQ associated with a PDSCH transmission (block 1720). For example, the network entity (e.g., using communication manager 150 and/or reception component 1902, depicted in FIG. 19) may receive, from the UE, a PUCCH transmission based at least in part on the configuration, wherein the PUCCH transmission indicates a HARQ associated with a PDSCH transmission, as described above.

Process 1700 may include additional aspects, such as any single aspect or any combination of aspects described below and/or in connection with one or more other processes described elsewhere herein.

In a first aspect, the PDSCH transmission is an SPS PDSCH transmission and the PUCCH transmission is a deferred PUCCH transmission, and the configuration is associated with not using the codebook based at least in part on the SPS PDSCH transmission configured with the deferred PUCCH transmission.

In a second aspect, alone or in combination with the first aspect, the PUCCH transmission is associated with a downlink grant PDSCH transmission or an SPS PDSCH transmission, and the configuration is associated with not using the codebook based at least in part on the PUCCH transmission being multiplexed with a PUSCH transmission.

In a third aspect, alone or in combination with one or more of the first and second aspects, the configuration indicates that different uplink and downlink slot sizes are not configured for the codebook based at least in part on the PDSCH transmission being an SPS PDSCH transmission with a deferred PUCCH transmission, or based at least in part on the PUCCH transmission having a likelihood of cancelation that satisfies a threshold.

In a fourth aspect, alone or in combination with one or more of the first through third aspects, the PUCCH transmission is associated with a deferred codebook or a canceled codebook, and the configuration prevents more than one deferred codebook or canceled codebook from being concatenated with a codebook associated with a second PDSCH transmission.

In a fifth aspect, alone or in combination with one or more of the first through fourth aspects, the PUCCH transmission is associated with a deferred codebook or a canceled codebook, wherein more than one deferred codebook or canceled codebook is configured to be concatenated with a codebook associated with a second PDSCH transmission, and an earliest deferred codebook or an earliest canceled codebook from the more than one deferred codebook or canceled codebook is configured to be concatenated with the codebook associated with the second PDSCH transmission.

In a sixth aspect, alone or in combination with one or more of the first through fifth aspects, the configuration enables an additional field to be added in each deferred codebook or canceled codebook, based at least in part on more than one codebook being concatenated with a codebook associated with a second PDSCH transmission, and the PUCCH transmission is based at least in part on the additional field.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
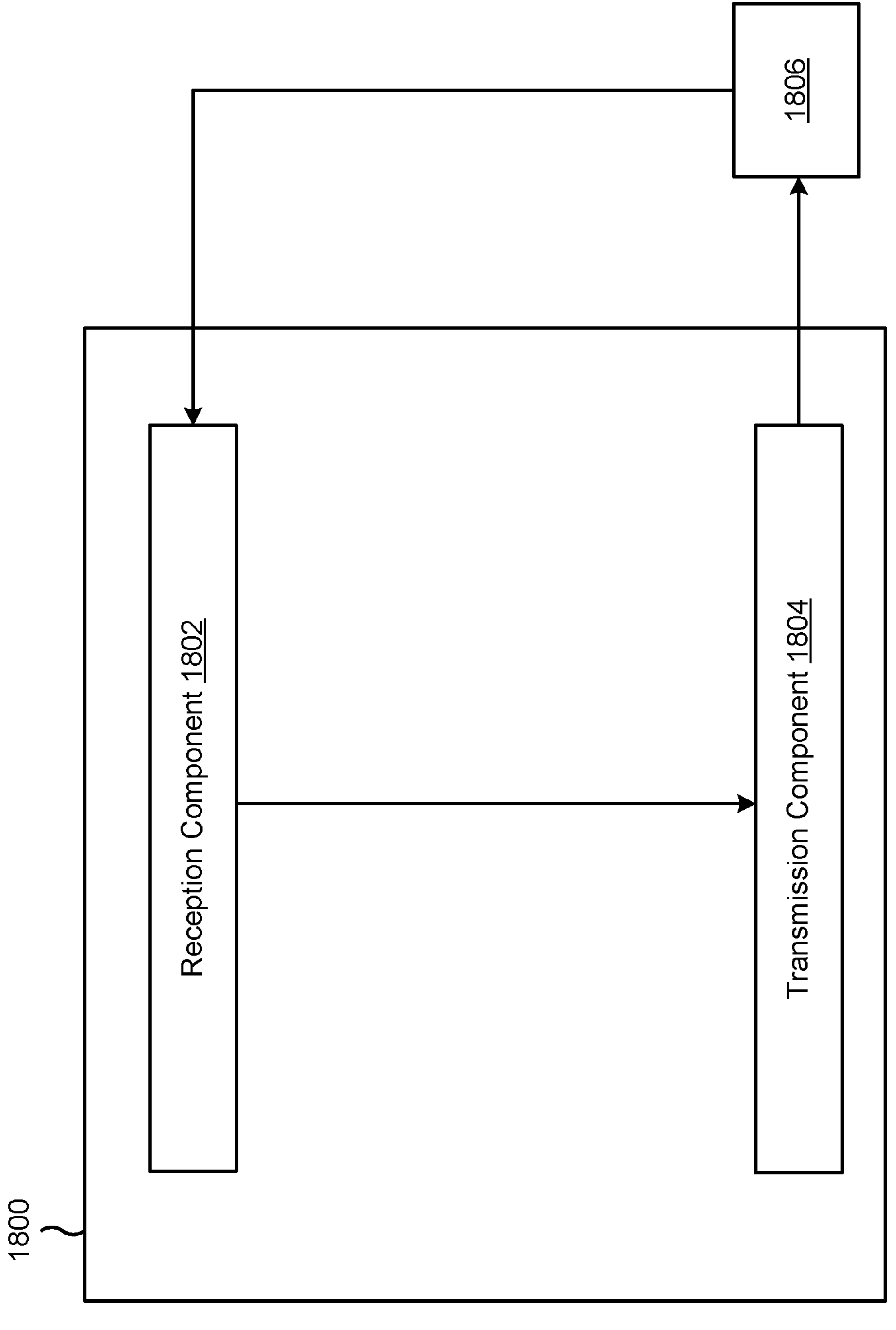
FIGS. 18-19 are block diagrams of example apparatuses for wireless communication, in accordance with the present disclosure.

FIG. 18 is a block diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a network entity, or another wireless communication device) using the reception component 1802 and the transmission component 1804.

In some aspects, the apparatus 1800 may be configured to perform one or more operations described herein in connection with FIGS. 8-13. Additionally, or alternatively, the apparatus 1800 may be configured to perform one or more processes described herein, such as process 1400 of FIG. 14, process 1600 of FIG. 16, or a combination thereof. In some aspects, the apparatus 1800 and/or one or more components shown in FIG. 18 may include one or more components of the UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the UE described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described in connection with FIG. 2. In some aspects, the transmission component 1804 may be co-located with the reception component 1802 in a transceiver.

The reception component 1802 may receive, from a network entity, a PDSCH transmission in a first slot, wherein the PDSCH transmission is associated with a codebook timespan. The transmission component 1804 may perform, to the network entity, a PUCCH transmission in a subsequent slot based at least in part on an adjustment to the codebook timespan, wherein the PUCCH transmission indicates a HARQ associated with the PDSCH transmission.

The reception component 1802 may receive, from a network entity, a configuration associated with a codebook, wherein the codebook is a type 1 codebook. The transmission component 1804 may perform, to the network entity, a PUCCH transmission based at least in part on the configuration, wherein the PUCCH transmission indicates a HARQ associated with a PDSCH transmission.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
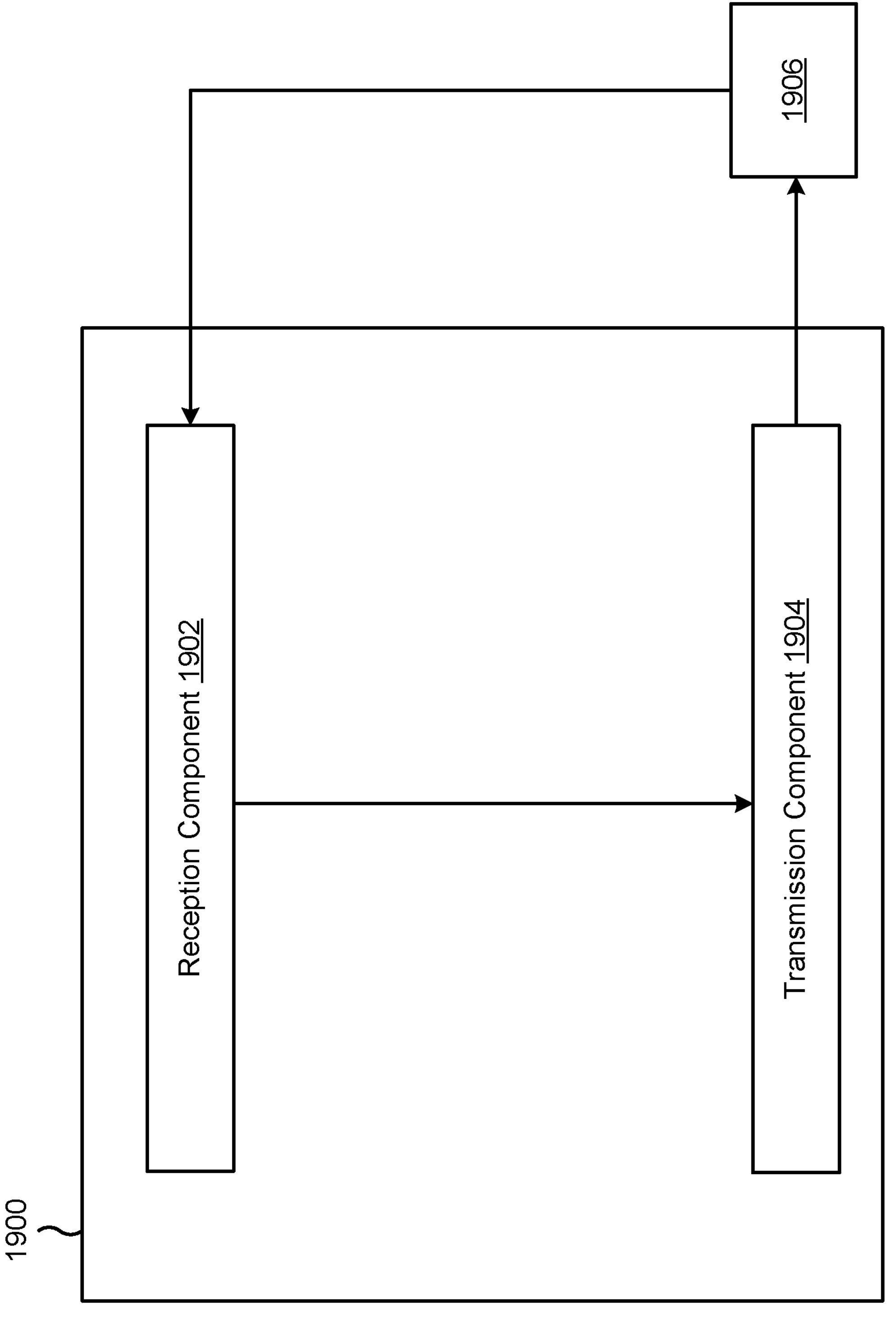

FIG. 19 is a block diagram of an example apparatus 1900 for wireless communication. The apparatus 1900 may be a network entity, or a network entity may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a network entity, or another wireless communication device) using the reception component 1902 and the transmission component 1904.

In some aspects, the apparatus 1900 may be configured to perform one or more operations described herein in connection with FIGS. 8-13. Additionally, or alternatively, the apparatus 1900 may be configured to perform one or more processes described herein, such as process 1500 of FIG. 15, process 1700 of FIG. 17, or a combination thereof. In some aspects, the apparatus 1900 and/or one or more components shown in FIG. 19 may include one or more components of the base station described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a demodulator, a MIMO detector, a receive processor, a controller/processor, a memory, or a combination thereof, of the base station described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the base station described in connection with FIG. 2. In some aspects, the transmission component 1904 may be co-located with the reception component 1902 in a transceiver.

The transmission component 1904 may transmit, to a UE, a PDSCH transmission in a first slot, wherein the PDSCH transmission is associated with a codebook timespan. The reception component 1902 may receive, from the UE, a PUCCH transmission in a subsequent slot based at least in part on an adjustment to the codebook timespan, wherein the PUCCH transmission indicates a HARQ associated with the PDSCH transmission.

The transmission component 1904 may transmit, to a UE, a configuration associated with a codebook, wherein the codebook is a type 1 codebook. The reception component 1902 may receive, from the UE, a PUCCH transmission based at least in part on the configuration, wherein the PUCCH transmission indicates a HARQ associated with a PDSCH transmission.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
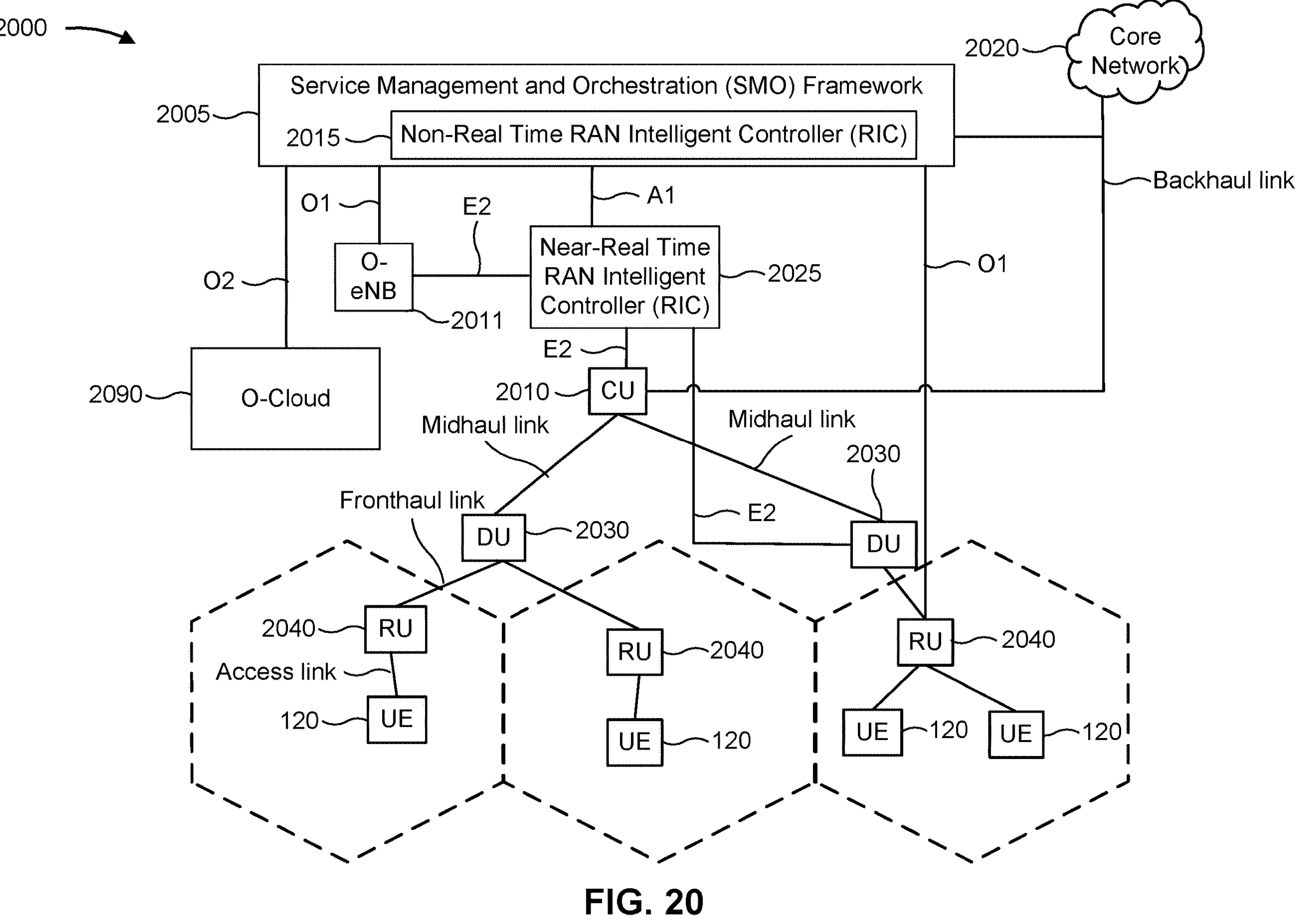
FIG. 20 is a diagram illustrating an example of a disaggregated base station architecture, in accordance with the present disclosure.

FIG. 20 is a diagram illustrating an example 2000 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, e.g., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 20 may include one or more CUs 2010 that can communicate directly with a core network 2020 via a backhaul link, or indirectly with the core network 2020 through one or more disaggregated base station units (such as a Near-RT RIC 2025 via an E2 link, or a Non-RT RIC 2015 associated with a Service Management and Orchestration (SMO) Framework 2005, or both). A CU 2010 may communicate with one or more DUs 2030 via respective midhaul links, such as an F1 interface. The DUs 2030 may communicate with one or more RUs 2040 via respective fronthaul links. The RUs 2040 may communicate with respective UEs 120 via one or more radio frequency (RF) access links. In some implementations, the UE 120 may be simultaneously served by multiple RUs 2040.

Each of the units (e.g., the CUs 2010, the DUs 2030, the RUs 2040), as well as the Near-RT RICs 2025, the Non-RT RICs 2015, and the SMO Framework 2005, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 2010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2010. The CU 2010 may be configured to handle user plane functionality (e.g., Central Unit-User Plane (CU-UP)), control plane functionality (e.g., Central Unit-Control Plane (CU-CP)), or a combination thereof. In some implementations, the CU 2010 can be logically split into one or more CU-UP units and one or more CU-CP units. The CU-UP unit can communicate bidirectionally with the CU-CP unit via an interface, such as the E1 interface when implemented in an O-RAN configuration. The CU 2010 can be implemented to communicate with the DU 2030, as necessary, for network control and signaling.

The DU 2030 may correspond to a logical unit that includes one or more base station functions to control the operation of one or more RUs 2040. In some aspects, the DU 2030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 2030 may further host one or more low-PHY layers. Each layer (or module) can be implemented with an interface configured to communicate signals with other layers (and modules) hosted by the DU 2030, or with the control functions hosted by the CU 2010.

Lower-layer functionality can be implemented by one or more RUs 2040. In some deployments, an RU 2040, controlled by a DU 2030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2040 can be implemented to handle over the air (OTA) communication with one or more UEs 120. In some implementations, real-time and non-real-time aspects of control and user plane communication with the RU(s) 2040 can be controlled by the corresponding DU 2030. In some scenarios, this configuration can enable the DU(s) 2030 and the CU 2010 to be implemented in a cloud-based RAN architecture, such as a vRAN architecture.

The SMO Framework 2005 may be configured to support RAN deployment and provisioning of non-virtualized and virtualized network elements. For non-virtualized network elements, the SMO Framework 2005 may be configured to support the deployment of dedicated physical resources for RAN coverage requirements which may be managed via an operations and maintenance interface (such as an O1 interface). For virtualized network elements, the SMO Framework 2005 may be configured to interact with a cloud computing platform (such as an open cloud (O-Cloud) 2090) to perform network element life cycle management (such as to instantiate virtualized network elements) via a cloud computing platform interface (such as an O2 interface). Such virtualized network elements can include, but are not limited to, CUs 2010, DUs 2030, RUs 2040 and Near-RT RICs 2025. In some implementations, the SMO Framework 2005 can communicate with a hardware aspect of a 4G RAN, such as an open eNB (O-eNB) 2011, via an O1 interface. Additionally, in some implementations, the SMO Framework 2005 can communicate directly with one or more RUs 2040 via an O1 interface. The SMO Framework 2005 also may include a Non-RT RIC 2015 configured to support functionality of the SMO Framework 2005.

The Non-RT RIC 2015 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2025. The Non-RT RIC 2015 may be coupled to or communicate with (such as via an A1 interface) the Near-RT RIC 2025. The Near-RT RIC 2025 may be configured to include a logical function that enables near-real-time control and optimization of RAN elements and resources via data collection and actions over an interface (such as via an E2 interface) connecting one or more CUs 2010, one or more DUs 2030, or both, as well as an O-eNB, with the Near-RT RIC 2025.

In some implementations, to generate AI/ML models to be deployed in the Near-RT RIC 2025, the Non-RT RIC 2015 may receive parameters or external enrichment information from external servers. Such information may be utilized by the Near-RT RIC 2025 and may be received at the SMO Framework 2005 or the Non-RT RIC 2015 from non-network data sources or from network functions. In some examples, the Non-RT RIC 2015 or the Near-RT RIC 2025 may be configured to tune RAN behavior or performance. For example, the Non-RT RIC 2015 may monitor long-term trends and patterns for performance and employ AI/ML models to perform corrective actions through the SMO Framework 2005 (such as reconfiguration via O1) or via creation of RAN management policies (such as A1 policies).

As indicated above, FIG. 20 is provided as an example. Other examples may differ from what is described with regard to FIG. 20.

The following provides an overview of some Aspects of the present disclosure:

Aspect 1: A method of wireless communication performed by a user equipment (UE), comprising: receiving, from a network entity, a physical downlink shared channel (PDSCH) transmission in a first slot, wherein the PDSCH transmission is associated with a codebook timespan; and performing, to the network entity, a physical uplink control channel (PUCCH) transmission in a subsequent slot based at least in part on an adjustment to the codebook timespan, wherein the PUCCH transmission indicates a hybrid automatic repeat request (HARQ) associated with the PDSCH transmission.

Aspect 2: The method of Aspect 1, wherein the PDSCH transmission is a semi-persistent scheduling PDSCH transmission.

Aspect 3: The method of any of Aspects 1 through 2, wherein the codebook timespan is a type 1 codebook timespan, and wherein the codebook timespan prior to the adjustment is based at least in part on a PDSCH-to-HARQ timing.

Aspect 4: The method of any of Aspects 1 through 3, wherein the subsequent slot is a third slot after the first slot, and wherein the PUCCH transmission cannot be performed in a second slot after the first slot based at least in part on a collision with downlink symbols in the second slot.

Aspect 5: The method of any of Aspects 1 through 4, wherein the PUCCH transmission is a deferred PUCCH transmission, wherein the PUCCH transmission is deferred to a first available PUCCH resource, and wherein the first available PUCCH resource is associated with the subsequent slot.

Aspect 6: The method of any of Aspects 1 through 5, further comprising: transmitting, to the network entity, an indication that the PUCCH transmission is associated with a deferred PUCCH transmission.

Aspect 7: The method of any of Aspects 1 through 6, further comprising: receiving, from the network entity, a radio resource control configuration that enables the codebook timespan to be adjusted.

Aspect 8: The method of any of Aspects 1 through 7, wherein the PDSCH transmission is a downlink grant PDSCH transmission.

Aspect 9: The method of any of Aspects 1 through 8, further comprising: receiving, from the network entity, a downlink grant PDSCH transmission based at least in part on downlink control information (DCI), wherein the DCI indicates the adjustment to the codebook timespan; and transmitting, to the network entity, the PUCCH transmission associated with the PDSCH transmission multiplexed with a PUCCH transmission associated with the downlink grant PDSCH transmission in the subsequent slot based at least in part on the adjustment to the codebook timespan, wherein the PUCCH transmission corresponds to a deferred PUCCH transmission or a canceled PUCCH transmission in a slot between the first slot and the subsequent slot.

Aspect 10: The method of any of Aspects 1 through 9, further comprising: transmitting, to the network entity, the PUCCH transmission associated with the PDSCH transmission multiplexed with a physical uplink shared channel retransmission in the subsequent slot based at least in part on the adjustment to the codebook timespan.

Aspect 11: The method of any of Aspects 1 through 10, wherein the subsequent slot is a third slot after the first slot, wherein the PUCCH transmission cannot be performed in a second slot after the first slot based at least in part on a cancelation of the PUCCH transmission in the second slot, and wherein the cancelation of the PUCCH transmission is based at least in part on a conflicting higher priority PUCCH transmission.

Aspect 12: A method of wireless communication performed by a network entity, comprising: transmitting, to a user equipment (UE), a physical downlink shared channel (PDSCH) transmission in a first slot, wherein the PDSCH transmission is associated with a codebook timespan; and receiving, from the UE, a physical uplink control channel (PUCCH) transmission in a subsequent slot based at least in part on an adjustment to the codebook timespan, wherein the PUCCH transmission indicates a hybrid automatic repeat request (HARQ) associated with the PDSCH transmission.

Aspect 13: The method of Aspect 12, wherein the PDSCH transmission is a semi-persistent scheduling PDSCH transmission.

Aspect 14: The method of any of Aspects 12 through 13, wherein the codebook timespan is a type 1 codebook timespan, and wherein the codebook timespan prior to the adjustment is based at least in part on a PDSCH-to-HARQ timing.

Aspect 15: The method of any of Aspects 12 through 14, wherein the subsequent slot is a third slot after the first slot, and wherein the PUCCH transmission cannot be performed in a second slot after the first slot based at least in part on a collision with downlink symbols in the second slot.

Aspect 16: The method of any of Aspects 12 through 15, wherein the PUCCH transmission is a deferred PUCCH transmission, wherein the PUCCH transmission is deferred to a first available PUCCH resource, and wherein the first available PUCCH resource is associated with the subsequent slot.

Aspect 17: The method of any of Aspects 12 through 16, further comprising: receiving, from the UE, an indication that the PUCCH transmission is associated with a deferred PUCCH transmission.

Aspect 18: The method of any of Aspects 12 through 17, further comprising: transmitting, to the UE, a radio resource control configuration that enables the codebook timespan to be adjusted.

Aspect 19: The method of any of Aspects 12 through 18, wherein the PDSCH transmission is a downlink grant PDSCH transmission.

Aspect 20: The method of any of Aspects 12 through 19, further comprising: transmitting, to the UE, a downlink grant PDSCH transmission based at least in part on downlink control information (DCI), wherein the DCI indicates the adjustment to the codebook timespan; and receiving, from the UE, the PUCCH transmission associated with the PDSCH transmission multiplexed with a PUCCH transmission associated with the downlink grant PDSCH transmission in the subsequent slot based at least in part on the adjustment to the codebook timespan, wherein the PUCCH transmission corresponds to a deferred PUCCH transmission or a canceled PUCCH transmission in a slot between the first slot and the subsequent slot.

Aspect 21: The method of any of Aspects 12 through 20, further comprising: receiving, from the UE, the PUCCH transmission associated with the PDSCH transmission multiplexed with a physical uplink shared channel retransmission in the subsequent slot based at least in part on the adjustment to the codebook timespan.

Aspect 22: The method of any of Aspects 12 through 21, wherein the subsequent slot is a third slot after the first slot, wherein the PUCCH transmission cannot be performed in a second slot after the first slot based at least in part on a cancelation of the PUCCH transmission in the second slot, and wherein the cancelation of the PUCCH transmission is based at least in part on a conflicting higher priority PUCCH transmission.

Aspect 23: A method of wireless communication performed by a user equipment (UE), comprising: receiving, from a network entity, a configuration associated with a codebook, wherein the codebook is a type 1 codebook; and performing, to the network entity, a physical uplink control channel (PUCCH) transmission based at least in part on the configuration, wherein the PUCCH transmission indicates a hybrid automatic repeat request (HARQ) associated with a physical downlink shared channel (PDSCH) transmission.

Aspect 24: The method of Aspect 23, wherein the PDSCH transmission is a semi-persistent scheduling PDSCH transmission and the PUCCH transmission is a deferred PUCCH transmission, and wherein the configuration is associated with not using the codebook based at least in part on the semi-persistent scheduling PDSCH transmission configured with the deferred PUCCH transmission.

Aspect 25: The method of any of Aspects 23 through 24, wherein the PUCCH transmission is associated with a downlink grant PDSCH transmission or a semi-persistent scheduling PDSCH transmission, and wherein the configuration is associated with not using the codebook based at least in part on the PUCCH transmission being multiplexed with a physical uplink shared channel transmission.

Aspect 26: The method of any of Aspects 23 through 25, wherein the configuration indicates that different uplink and downlink slot sizes are not configured for the codebook based at least in part on the PDSCH transmission being a semi-persistent scheduling PDSCH transmission with a deferred PUCCH transmission, or based at least in part on the PUCCH transmission having a likelihood of cancelation that satisfies a threshold.

Aspect 27: The method of any of Aspects 23 through 26, wherein the PUCCH transmission is associated with a deferred codebook or a canceled codebook, and wherein the configuration prevents more than one deferred codebook or canceled codebook from being concatenated with a codebook associated with a second PDSCH transmission.

Aspect 28: The method of any of Aspects 23 through 27, wherein the PUCCH transmission is associated with a deferred codebook or a canceled codebook, wherein more than one deferred codebook or canceled codebook is configured to be concatenated with a codebook associated with a second PDSCH transmission, and wherein an earliest deferred codebook or an earliest canceled codebook from the more than one deferred codebook or canceled codebook is configured to be concatenated with the codebook associated with the second PDSCH transmission.

Aspect 29: The method of any of Aspects 23 through 28, wherein the configuration enables an additional field to be added in each deferred codebook or canceled codebook, based at least in part on more than one codebook being concatenated with a codebook associated with a second PDSCH transmission, and wherein the PUCCH transmission is based at least in part on the additional field.

Aspect 30: A method of wireless communication performed by a network entity, comprising: transmitting, to a user equipment (UE), a configuration associated with a codebook, wherein the codebook is a type 1 codebook; and receiving, from the UE, a physical uplink control channel (PUCCH) transmission based at least in part on the configuration, wherein the PUCCH transmission indicates a hybrid automatic repeat request (HARQ) associated with a physical downlink shared channel (PDSCH) transmission.

Aspect 31: The method of Aspect 30, wherein the PDSCH transmission is a semi-persistent scheduling PDSCH transmission and the PUCCH transmission is a deferred PUCCH transmission, and wherein the configuration is associated with not using the codebook based at least in part on the semi-persistent scheduling PDSCH transmission configured with the deferred PUCCH transmission.

Aspect 32: The method of any of Aspects 30 through 31, wherein the PUCCH transmission is associated with a downlink grant PDSCH transmission or a semi-persistent scheduling PDSCH transmission, and wherein the configuration is associated with not using the codebook based at least in part on the PUCCH transmission being multiplexed with a physical uplink shared channel transmission.

Aspect 33: The method of any of Aspects 30 through 32, wherein the configuration indicates that different uplink and downlink slot sizes are not configured for the codebook based at least in part on the PDSCH transmission being a semi-persistent scheduling PDSCH transmission with a deferred PUCCH transmission, or based at least in part on the PUCCH transmission having a likelihood of cancelation that satisfies a threshold.

Aspect 34: The method of any of Aspects 30 through 33, wherein the PUCCH transmission is associated with a deferred codebook or a canceled codebook, and wherein the configuration prevents more than one deferred codebook or canceled codebook from being concatenated with a codebook associated with a second PDSCH transmission.

Aspect 35: The method of any of Aspects 30 through 34, wherein the PUCCH transmission is associated with a deferred codebook or a canceled codebook, wherein more than one deferred codebook or canceled codebook is configured to be concatenated with a codebook associated with a second PDSCH transmission, and wherein an earliest deferred codebook or an earliest canceled codebook from the more than one deferred codebook or canceled codebook is configured to be concatenated with the codebook associated with the second PDSCH transmission.

Aspect 36: The method of any of Aspects 30 through 35, wherein the configuration enables an additional field to be added in each deferred codebook or canceled codebook, based at least in part on more than one codebook being concatenated with a codebook associated with a second PDSCH transmission, and wherein the PUCCH transmission is based at least in part on the additional field.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a user equipment (UE) for wireless communication, comprising:

a memory; and one or more processors, coupled to the memory, configured to:

receive, from a network entity, a physical downlink shared channel (PDSCH) transmission in a first slot, wherein the PDSCH transmission is associated with a codebook timespan;

perform, to the network entity, a physical uplink control channel (PUCCH) transmission in a subsequent slot based at least in part on an adjustment to the codebook timespan, wherein the PUCCH transmission indicates a hybrid automatic repeat request (HARQ) associated with the PDSCH transmission; and transmit, to the network entity, the PUCCH transmission associated with the PDSCH transmission multiplexed with a physical uplink shared channel retransmission in the subsequent slot based at least in part on the adjustment to the codebook timespan.

2. The apparatus of claim 1, wherein the PDSCH transmission is a semi-persistent scheduling PDSCH transmission.

3. The apparatus of claim 1, wherein the codebook timespan is a type 1 codebook timespan, and wherein the codebook timespan prior to the adjustment is based at least in part on a PDSCH-to-HARQ timing.

4. The apparatus of claim 1, wherein the subsequent slot is a third slot after the first slot, and wherein the PUCCH transmission cannot be performed in a second slot after the first slot based at least in part on a collision with downlink symbols in the second slot.

5. The apparatus of claim 1, wherein the PUCCH transmission is a deferred PUCCH transmission, wherein the PUCCH transmission is deferred to a first available PUCCH resource, and wherein the first available PUCCH resource is associated with the subsequent slot.

6. The apparatus of claim 1, wherein the one or more processors are further configured to:

transmit, to the network entity, an indication that the PUCCH transmission is associated with a deferred PUCCH transmission.

7. The apparatus of claim 1, wherein the one or more processors are further configured to:

receive, from the network entity, a radio resource control configuration that enables the codebook timespan to be adjusted.

8. The apparatus of claim 1, wherein the PDSCH transmission is a downlink grant PDSCH transmission.

9. The apparatus of claim 1, wherein the one or more processors are further configured to:

receive, from the network entity, a downlink grant PDSCH transmission based at least in part on downlink control information (DCI), wherein the DCI indicates the adjustment to the codebook timespan; and transmit, to the network entity, the PUCCH transmission associated with the PDSCH transmission multiplexed with a PUCCH transmission associated with the downlink grant PDSCH transmission in the subsequent slot based at least in part on the adjustment to the codebook timespan, wherein the PUCCH transmission corresponds to a deferred PUCCH transmission or a canceled PUCCH transmission in a slot between the first slot and the subsequent slot.

10. The apparatus of claim 1, wherein the subsequent slot is a third slot after the first slot, wherein the PUCCH transmission cannot be performed in a second slot after the first slot based at least in part on a cancelation of the PUCCH transmission in the second slot, and wherein the cancelation of the PUCCH transmission is based at least in part on a conflicting higher priority PUCCH transmission.

11. An apparatus of a network entity for wireless communication, comprising:

a memory; and one or more processors, coupled to the memory, configured to:

transmit, to a user equipment (UE), a physical downlink shared channel (PDSCH) transmission in a first slot, wherein the PDSCH transmission is associated with a codebook timespan;

receive, from the UE, a physical uplink control channel (PUCCH) transmission in a subsequent slot based at least in part on an adjustment to the codebook timespan, wherein the PUCCH transmission indicates a hybrid automatic repeat request (HARQ) associated with the PDSCH transmission; and receive, from the UE, the PUCCH transmission associated with the PDSCH transmission multiplexed with a physical uplink shared channel retransmission in the subsequent slot based at least in part on the adjustment to the codebook timespan.

12. The apparatus of claim 11, wherein the PDSCH transmission is a semi-persistent scheduling PDSCH transmission.

13. The apparatus of claim 11, wherein the codebook timespan is a type 1 codebook timespan, and wherein the codebook timespan prior to the adjustment is based at least in part on a PDSCH-to-HARQ timing.

14. The apparatus of claim 11, wherein the subsequent slot is a third slot after the first slot, and wherein the PUCCH transmission cannot be performed in a second slot after the first slot based at least in part on a collision with downlink symbols in the second slot.

15. The apparatus of claim 11, wherein the PUCCH transmission is a deferred PUCCH transmission, wherein the PUCCH transmission is deferred to a first available PUCCH resource, and wherein the first available PUCCH resource is associated with the subsequent slot.

16. The apparatus of claim 11, wherein the one or more processors are further configured to:

receive, from the UE, an indication that the PUCCH transmission is associated with a deferred PUCCH transmission.

17. The apparatus of claim 11, wherein the one or more processors are further configured to:

transmit, to the UE, a radio resource control configuration that enables the codebook timespan to be adjusted.

18. The apparatus of claim 11, wherein the PDSCH transmission is a downlink grant PDSCH transmission.

19. The apparatus of claim 11, wherein the one or more processors are further configured to:

transmit, to the UE, a downlink grant PDSCH transmission based at least in part on downlink control information (DCI), wherein the DCI indicates the adjustment to the codebook timespan; and receive, from the UE, the PUCCH transmission associated with the PDSCH transmission multiplexed with a PUCCH transmission associated with the downlink grant PDSCH transmission in the subsequent slot based at least in part on the adjustment to the codebook timespan, wherein the PUCCH transmission corresponds to a deferred PUCCH transmission or a canceled PUCCH transmission in a slot between the first slot and the subsequent slot.

20. The apparatus of claim 11, wherein the subsequent slot is a third slot after the first slot, wherein the PUCCH transmission cannot be performed in a second slot after the first slot based at least in part on a cancelation of the PUCCH transmission in the second slot, and wherein the cancelation of the PUCCH transmission is based at least in part on a conflicting higher priority PUCCH transmission.

21. An apparatus of a user equipment (UE) for wireless communication, comprising:

a memory; and one or more processors, coupled to the memory, configured to:

receive, from a network entity, a configuration associated with a codebook, wherein the codebook is a type 1 codebook;

perform, to the network entity, a physical uplink control channel (PUCCH) transmission based at least in part on the configuration, wherein the PUCCH transmission indicates a hybrid automatic repeat request (HARQ) associated with a physical downlink shared channel (PDSCH) transmission; and wherein the configuration indicates that different uplink and downlink slot sizes are not configured for the codebook based at least in part on the PDSCH transmission being a semi-persistent scheduling PDSCH transmission with a deferred PUCCH transmission, or based at least in part on the PUCCH transmission having a likelihood of cancelation that satisfies a threshold.

22. The apparatus of claim 21, wherein the PDSCH transmission is a semi-persistent scheduling PDSCH transmission and the PUCCH transmission is a deferred PUCCH transmission, and wherein the configuration is associated with not using the codebook based at least in part on the semi-persistent scheduling PDSCH transmission configured with the deferred PUCCH transmission.

23. The apparatus of claim 21, wherein the PUCCH transmission is associated with a downlink grant PDSCH transmission or a semi-persistent scheduling PDSCH transmission, and wherein the configuration is associated with not using the codebook based at least in part on the PUCCH transmission being multiplexed with a physical uplink shared channel transmission.

24. The apparatus of claim 21, wherein the PUCCH transmission is associated with a deferred codebook or a canceled codebook, and wherein the configuration prevents more than one deferred codebook or canceled codebook from being concatenated with a codebook associated with a second PDSCH transmission.

25. The apparatus of claim 21, wherein the PUCCH transmission is associated with a deferred codebook or a canceled codebook, wherein more than one deferred codebook or canceled codebook is configured to be concatenated with a codebook associated with a second PDSCH transmission, and wherein an earliest deferred codebook or an earliest canceled codebook from the more than one deferred codebook or canceled codebook is configured to be concatenated with the codebook associated with the second PDSCH transmission.

26. The apparatus of claim 21, wherein the configuration enables an additional field to be added in each deferred codebook or canceled codebook, based at least in part on more than one codebook being concatenated with a codebook associated with a second PDSCH transmission, and wherein the PUCCH transmission is based at least in part on the additional field.

* * * * *